(12) United States Patent
Cherkas

(10) Patent No.: US 11,695,661 B1
(45) Date of Patent: *Jul. 4, 2023

(54) SYSTEMS AND METHODS FOR DEPLOYING A CLOUD MANAGEMENT SYSTEM CONFIGURED FOR TAGGING CONSTRUCTS DEPLOYED IN A MULTI-CLOUD ENVIRONMENT

(71) Applicant: AVIATRIX SYSTEMS, INC., Santa Clara, CA (US)

(72) Inventor: Jacob Cherkas, Santa Clara, CA (US)

(73) Assignee: Aviatrix Systems, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/510,293

(22) Filed: Oct. 25, 2021

Related U.S. Application Data

(63) Continuation of application No. 17/127,927, filed on Dec. 18, 2020, now Pat. No. 11,159,383.
(Continued)

(51) Int. Cl.
*H04L 43/045* (2022.01)
*H04L 12/66* (2006.01)
(Continued)

(52) U.S. Cl.
CPC ............ *H04L 43/045* (2013.01); *H04L 12/66* (2013.01); *H04L 41/12* (2013.01); *H04L 41/122* (2022.05);
(Continued)

(58) Field of Classification Search
CPC ............ H04L 41/12–122; H04L 41/22; H04L 43/02–0867
See application file for complete search history.

(56) References Cited

U.S. PATENT DOCUMENTS

| | | | |
|---|---|---|---|
| 9,426,045 | B2 | 8/2016 | Fletcher et al. |
| 9,590,876 | B2 | 3/2017 | Purusothaman |

(Continued)

OTHER PUBLICATIONS

"Database" The Authoritative Dictionary of IEEE Standard Terms. 7th ed. 2000.
(Continued)

*Primary Examiner* — Brendan Y Higa
(74) *Attorney, Agent, or Firm* — Winstead PC

(57) ABSTRACT

A distributed cloud computing system is disclosed that includes a controller configured to deploy a first gateway in a first cloud computing network and a second gateway in a second cloud computing network and logic. The logic, upon execution by one or more processors, causes performance of operations including generating a topology mapping visualization illustrating a plurality of constructs and communication paths therebetween, wherein a first subset of the plurality of constructs are deployed in the first cloud computing network and a second subset of the plurality of constructs are deployed in the second cloud computing network, receiving user input corresponding to (i) a selection of one or more constructs and (ii) an identifier for the selection, generating a filtered topology mapping visualization of the selection of the one or more constructs and any connections therebetween, and causing rendering of the filtered topology mapping visualization on a display screen.

20 Claims, 24 Drawing Sheets

Related U.S. Application Data

(60) Provisional application No. 63/013,529, filed on Apr. 21, 2020.

(51) Int. Cl.

| | | |
|---|---|---|
| *H04L 41/12* | (2022.01) | |
| *H04L 43/0876* | (2022.01) | |
| *H04L 41/22* | (2022.01) | |
| *H04L 41/122* | (2022.01) | |
| *H04L 43/028* | (2022.01) | |

(52) U.S. Cl.
CPC ............ *H04L 41/22* (2013.01); *H04L 43/028* (2013.01); *H04L 43/0876* (2013.01)

(56) References Cited

U.S. PATENT DOCUMENTS

| | | |
|---|---|---|
| 9,942,787 B1 | 4/2018 | Tillotson |
| 10,091,348 B1 | 10/2018 | Arunachalam et al. |
| 10,122,605 B2 | 11/2018 | Kulkarni et al. |
| 10,237,148 B2 * | 3/2019 | Izhak-Ratzin ........ H04L 43/065 |
| 10,291,479 B1 * | 5/2019 | Oren ................... H04L 41/145 |
| 10,320,644 B1 | 6/2019 | Chen et al. |
| 10,374,904 B2 | 8/2019 | Dubey et al. |
| 10,547,521 B1 | 1/2020 | Roy et al. |
| 10,565,220 B2 | 2/2020 | Porath et al. |
| 10,728,121 B1 | 7/2020 | Chitalia et al. |
| 10,762,081 B1 | 9/2020 | Porath et al. |
| 10,924,419 B1 | 2/2021 | Chitalia et al. |
| 11,159,383 B1 | 10/2021 | Cherkas |
| 11,265,233 B2 | 3/2022 | Cherkas |
| 11,283,695 B2 | 3/2022 | Cherkas |
| 11,356,344 B2 | 6/2022 | Cherkas |
| 2005/0232230 A1 | 10/2005 | Nagami et al. |
| 2013/0091270 A1 | 4/2013 | Zhang et al. |
| 2014/0007079 A1 | 1/2014 | Whitney et al. |
| 2014/0282027 A1 | 9/2014 | Gao et al. |
| 2014/0282525 A1 | 9/2014 | Sapuram et al. |
| 2014/0297835 A1 | 10/2014 | Buys |
| 2014/0317167 A1 | 10/2014 | Wahl et al. |
| 2015/0052525 A1 | 2/2015 | Raghu |
| 2015/0149611 A1 | 5/2015 | Lissack |
| 2015/0263885 A1 | 9/2015 | Kasturi et al. |
| 2016/0072676 A1 | 3/2016 | Gomadam et al. |
| 2016/0197834 A1 | 7/2016 | Luft |
| 2016/0274558 A1 | 9/2016 | Strohmenger et al. |
| 2016/0275201 A1 | 9/2016 | Li et al. |
| 2016/0352682 A1 | 12/2016 | Chang et al. |
| 2017/0085446 A1 | 3/2017 | Zhong et al. |
| 2017/0093645 A1 | 3/2017 | Zhong et al. |
| 2017/0230451 A1 | 8/2017 | Paramasivam |
| 2017/0250887 A1 | 8/2017 | Sadana et al. |
| 2017/0373932 A1 | 12/2017 | Subramanian et al. |
| 2018/0131585 A1 | 5/2018 | Bliesner et al. |
| 2018/0285166 A1 | 10/2018 | Roy et al. |
| 2018/0309637 A1 | 10/2018 | Gill et al. |
| 2018/0322433 A1 | 11/2018 | van Heusden et al. |
| 2019/0028909 A1 | 1/2019 | Mermoud et al. |
| 2019/0147096 A1 | 5/2019 | Ponnada et al. |
| 2019/0190830 A1 | 6/2019 | Litzinger |
| 2020/0067800 A1 * | 2/2020 | Wang ..................... H04L 41/12 |
| 2020/0092251 A1 | 3/2020 | Peterson et al. |
| 2020/0202026 A1 | 6/2020 | Dharanikota et al. |
| 2021/0026895 A1 * | 1/2021 | Banerjee ............. H04L 41/0813 |
| 2021/0051100 A1 | 2/2021 | Chitalia et al. |
| 2021/0141900 A1 | 5/2021 | Brown et al. |
| 2021/0168056 A1 | 6/2021 | Qian et al. |
| 2021/0328875 A1 | 10/2021 | Cherkas |
| 2021/0328876 A1 | 10/2021 | Cherkas |
| 2021/0328882 A1 | 10/2021 | Cherkas |
| 2021/0328883 A1 | 10/2021 | Cherkas |
| 2021/0328891 A1 | 10/2021 | Cherkas |
| 2021/0328892 A1 | 10/2021 | Cherkas |
| 2021/0328893 A1 | 10/2021 | Cherkas |

OTHER PUBLICATIONS

Jayaraman et al. "Analytics-as-a-service in a multi-cloud environment through semantically-enabled hierarchical data processing." Software Practice and Experience 00:1-18; 2010.
Oracle. "Advantages of Using Aviatrix to Extend Native Cloud Networking Constructs." 1-30 Oracle Cloud Infrastructure Blog. (https://blogs.oracle.com/cloud-infrastructure/advantages-of-using-aviatrix-to-extend-native-cloud-networking-constructs) Nov. 14, 2019.
PCT/US2021/028243 filed Apr. 20, 2021 International Search Report and Written Opinion dated Oct. 20, 2021.
PCT/US2021/028248 filed Apr. 20, 2021 International Search Report and Written Opinion dated Jul. 22, 2021.
U.S. Appl. No. 17/006,657, filed Aug. 28, 2020 Non-Final Office Action dated Jul. 22, 2021.
U.S. Appl. No. 17/127,924, filed Dec. 18, 2020 Non-Final Office Action dated Sep. 20, 2021.
U.S. Appl. No. 17/127,925, filed Dec. 18, 2020 Non-Final Office Action dated Jun. 24, 2021.
U.S. Appl. No. 17/127,925, filed Dec. 18, 2020 Notice of Allowance dated Oct. 13, 2021.
U.S. Appl. No. 17/127,927, filed Dec. 18, 2020, Non-Final Office Action dated Mar. 2, 2021.
U.S. Appl. No. 17/127,927, filed Dec. 18, 2020, Notice of Allowance dated Jun. 25, 2021.
U.S. Appl. No. 17/127,955, filed Dec. 18, 2020 Non-Final Office Action dated May 24, 2021.
U.S. Appl. No. 17/006,657, filed Aug. 28, 2020 Notice of Allowance dated Nov. 15, 2021.
U.S. Appl. No. 17/127,920, filed Dec. 18, 2020, Non-Final Office Action dated Dec. 27, 2021.
U.S. Appl. No. 17/127,922, filed Dec. 18, 2020 Non-Final Office Action dated Feb. 11, 2022.
U.S. Appl. No. 17/127,924, filed Dec. 18, 2020 Final Office Action dated Jan. 6, 2022.
U.S. Appl. No. 17/127,955, filed Dec. 18, 2020 Notice of Allowance dated Feb. 1, 2022.
PCT/US2021/028243 filed Apr. 20, 2021 International Preliminary Report on Patentability, dated Oct. 20, 2021.
U.S. Appl. No. 17/127,922, filed Dec. 18, 2020 Notice of Allowance dated May 31, 2022.

* cited by examiner

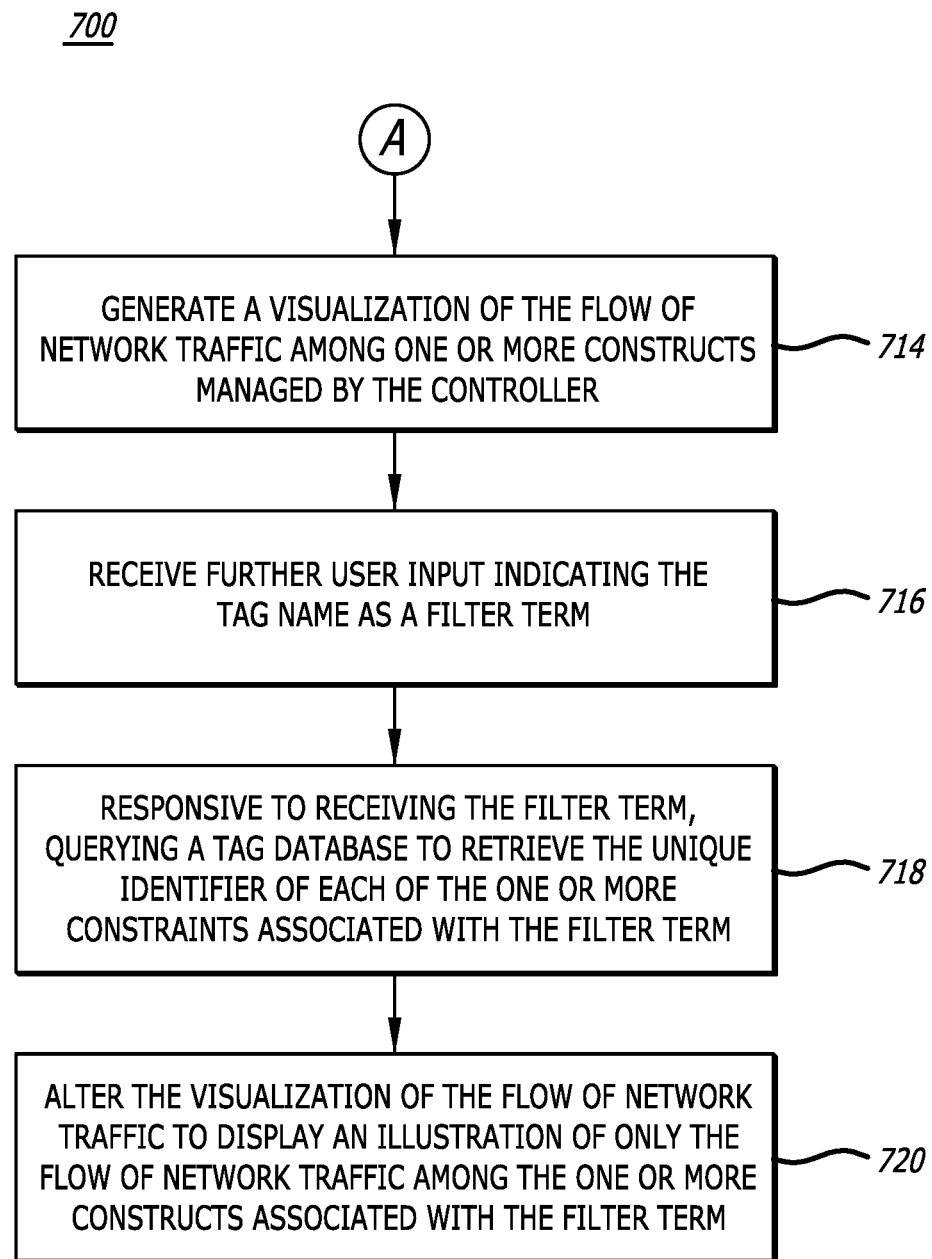

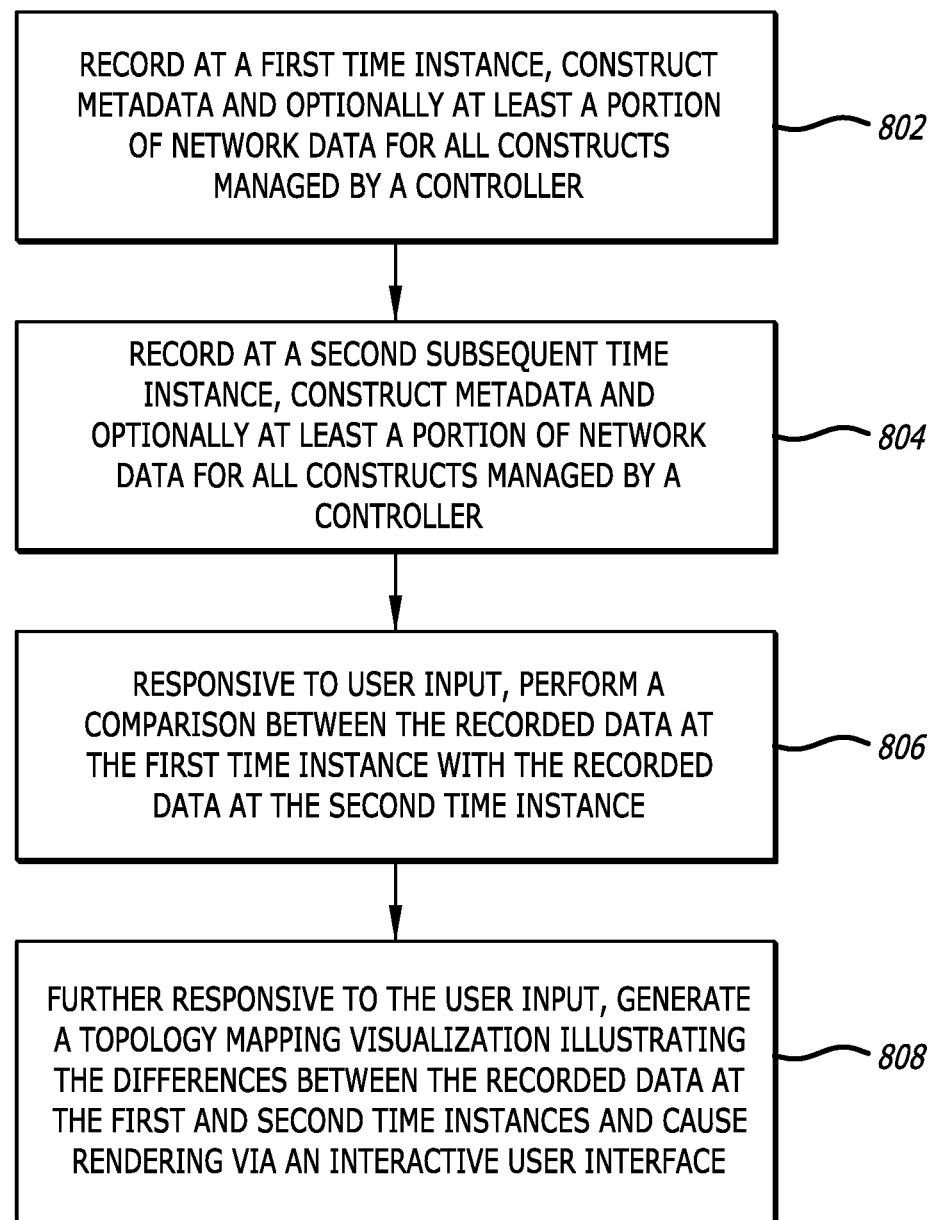

SYSTEMS AND METHODS FOR DEPLOYING A CLOUD MANAGEMENT SYSTEM CONFIGURED FOR TAGGING CONSTRUCTS DEPLOYED IN A MULTI-CLOUD ENVIRONMENT

CROSS-REFERENCE TO RELATED APPLICATIONS

This application is a continuation of U.S. patent application Ser. No. 17/127927 filed Dec. 18, 2020, now U.S. Pat. No. 11,159,383 issued Oct. 26, 2021, which claims the benefit of priority on U.S. Provisional Patent Application No. 63/013,529, titled "System, Method and Apparatus For Generating and Searching A Topology Of Resources Among Multiple Cloud Environments" and filed Apr. 21, 2020, and U.S. Provisional Patent Application No. 63/020,425, titled "Systems and Methods For Deploying a Distributed Cloud Management System Configured For Generation of Interactive User Interfaces" and filed May 5, 2020, the entire contents of which is incorporated by reference herein.

FIELD

Embodiments of the disclosure relate to the field of cloud networking. More specifically, one embodiment of the disclosure is directed to a system and method for providing operational visibility of an enterprise network spanning a single public cloud network or a multiple public cloud networks.

GENERAL BACKGROUND

Until recently, businesses have relied on application software installed on one or more electronic devices residing in close proximity to its user (hereinafter, "on-premises electronic devices"). These on-premises electronic devices may correspond to an endpoint device (e.g., personal computer, cellular smartphone, netbook, etc.), a locally maintained mainframe, or even a local server for example. Depending on the size of the business, the purchase of the on-premises electronic devices and their corresponding software required a significant upfront capital outlay, along with significant ongoing operational costs to maintain the operability of these on-premises electronic devices. These operational costs may include the costs for deploying, managing, maintaining, upgrading, repairing and replacing these electronic devices.

Recently, more businesses and individuals have begun to rely on public cloud networks (hereinafter, "public cloud") for providing users to a variety of services, from word processing application functionality to network management. A "public cloud" is a fully virtualized environment with a multi-tenant architecture that provides tenants (i.e., users) with an ability to share computing and storage resources while, at the same time, retaining data isolation within each user's cloud account. The virtualized environment includes on-demand, cloud computing platforms that are provided by a collection of physical data centers, where each data center includes numerous servers hosted by the cloud provider. Examples of different types of public cloud networks may include, but is not limited or restricted to AMAZON WEB SERVICES®, MICROSOFT® AZURE®, GOOGLE CLOUD PLATFORM™ or ORACLE CLOUD™ for example.

This growing reliance on public cloud networks is due, in large part, to a number of cost saving advantages offered by this particular deployment. However, for many type of services, such as network management for example, network administrators face a number of challenges when business operations rely on operability of a single public cloud or operability of multiple public cloud networks. For instance, where the network deployed by an enterprise relies on multiple public cloud networks (hereinafter, "multi-cloud network"), network administrators have been unable to effectively troubleshoot connectivity issues that occur within the multi-cloud network. One reason for such ineffective troubleshooting is there are no conventional solutions available to administrators or users to visualize connectivity of its multi-cloud network deployment. Another reason is that cloud network providers permit the user with access to only a limited number of constructs, thereby controlling the type and amount of network information accessible by the user. As a result, the type or amount of network information is rarely sufficient to enable an administrator or user to quickly and effectively troubleshoot and correct network connectivity issues.

Likewise, there are no conventional solutions to visually monitor the exchange of traffic between network devices in different public cloud networks (multi-cloud network) and retain state information associated with network devices with the multi-cloud network to more quickly detect operational abnormalities that may suggest a cyberattack is in process or the health of the multi-cloud network is compromised.

BRIEF DESCRIPTION OF THE DRAWINGS

Embodiments of the disclosure are illustrated by way of example and not by way of limitation in the figures of the accompanying drawings, in which like references indicate similar elements and in which:

FIGS. 7A-7B is a flowchart of methods of tagging and searching performed by the topology system logic and illustrated in FIGS. 4A-5A according to some embodiments; and FIG. 8 is a flowchart of an exemplary method of the replay function performed by the topology system logic and illustrated in FIGS. 4G-4H according to some embodiments.

DETAILED DESCRIPTION

Figure 1:
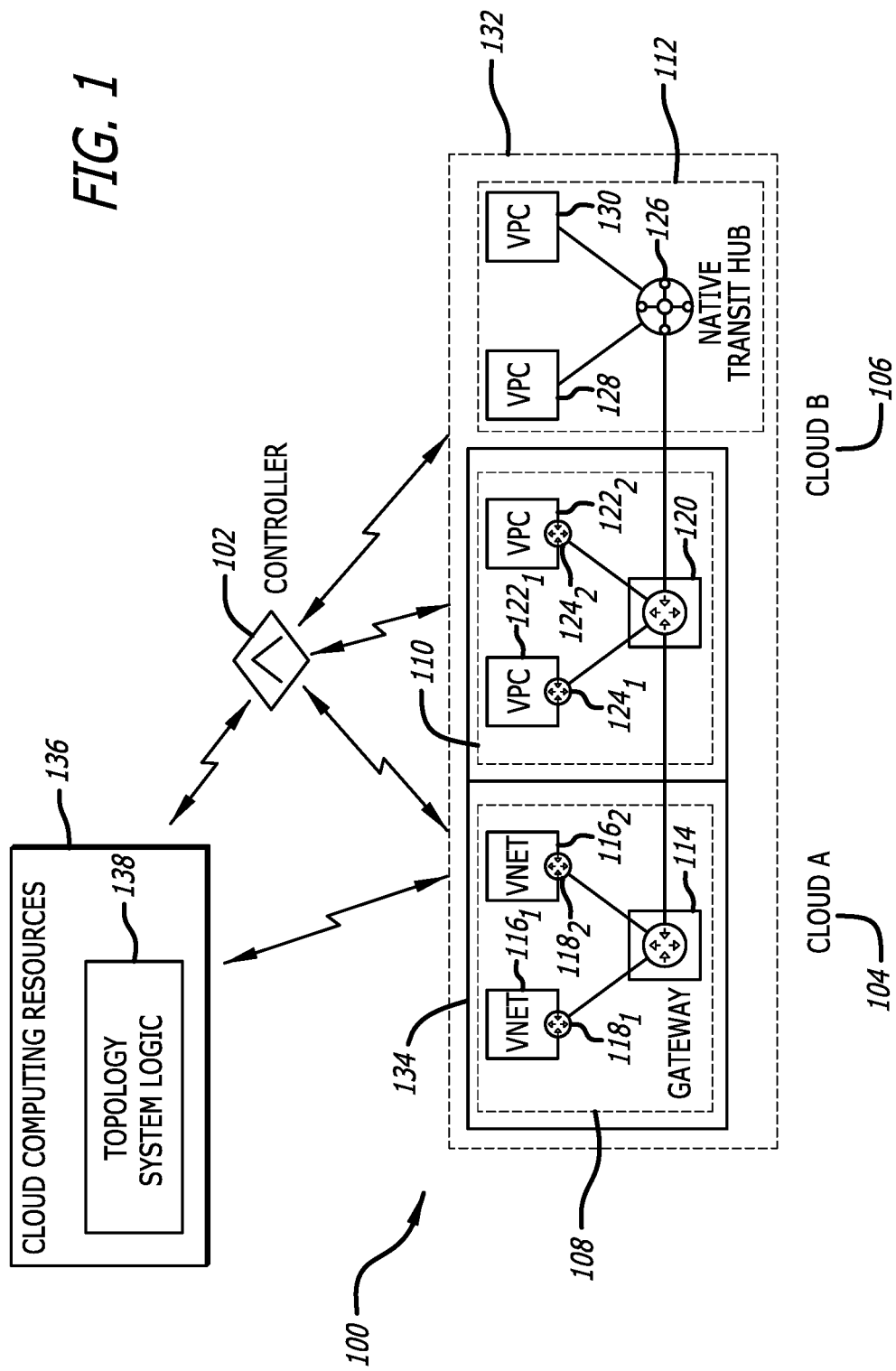
FIG. 1 is a diagram of an exemplary embodiment of a distributed cloud computing system including a controller managing constructs spanning multiple cloud networks according to some embodiments.

Embodiments of the disclosure are directed to a system configured to provide operational visibility of a network that spans one or more cloud computing environments. According to one embodiment, the system may include a software instance that is operating in one or more cloud computing resources and is configured to collect information and render a graphic user interface (GUI) that provides an interactive, visual rendering of the connectively between constructs of a network spanning multiple (two or more) cloud computing environments (hereinafter, a "multi-cloud computing environment or a "multi-cloud network"). In other embodiments, the system includes the software instance and a controller configured to manage constructs deployed in one or more cloud computing environments such as within a multi-cloud environment and communicate with the software instance.

As will be discussed below in further detail, the software instance may query the controller for information using one or more Application Programming Interface (API) calls to retrieve information stored by the controller detailing status information of each construct managed by the controller. The controller obtains such information from one or more gateways deployed within a multi-cloud network, where the gateway(s) are configured to transmit this information to the controller on a periodic (or aperiodic) basis. It should be understood that, as discussed herein, the term "multi-cloud networks" refers a plurality of cloud networks, where each cloud network may constitute a public cloud network provided by a different cloud computing environment resource provider (hereinafter, "cloud provider").

As is known in the art, a controller may be configured to program each gateway to control routing of network traffic such as by providing instructions to gateways as to how network traffic is routed among various gateways. As illustrative examples, the controller may instruct a gateway as to whether a virtual machine (VM) from one subnet work (hereinafter, "subnet") may communicate directly with a VM from another subnet, or how network traffic will flow from a source to a destination within the cloud computing environment managed by the controller. In addition, embodiments of the disclosure discuss instructions provided by the software instance to the controller, which are then transmitted to one or more gateways by the controller and include instructions to transmit network data from the gateway to a routable address (e.g., an Internet Protocol "IP" address, etc.) of the software instance.

Therefore, as a general embodiment, the software instance may query the controller for data indicating a status and metadata of each construct managed by the controller and also receive network data from one or more gateways. The software instance includes logic that, upon execution by one or more processors (e.g., being part of the cloud computing resources), generates various visualizations that are a combination of the construct status and metadata (collectively "construct metadata") and the network data. The visualizations may be interactive and provided to users such as network administrators, information technology (IT) professionals, or the like. Additionally, the visualizations may be configured to receive user input, which causes the logic of the software instance ("topology system logic") to alter the visualizations. As discussed below and illustrated in the accompanying drawings, the visualizations may include, but are not limited or restricted to, a dashboard view providing overall status and health of the network as well as specific network parameters; a dynamic topology mapping that provides a visual rendering of each construct and links that identify communications between the constructs; and a network flow visualization providing various illustrations detailing how network traffic is flowing (or has flowed) through the cloud computing environment managed by the controller. Each of the visualizations may provide data spanning a multi-cloud network.

In some embodiments, responsive to the user input, the topology system logic may generate tags for one or more of the constructs via the topology mapping visualization and store those tags for searching. For example, further user input may be received causing the topology system logic to search the numerous constructs managed by the controller and display the tagged constructs, as well as any links therebetween, via the topology mapping. In yet some embodiments, responsive to received user input including one or more tags as search items, the topology system logic may generate visualizations illustrating the network flow of the corresponding tagged construct(s).

By querying the controller for construct metadata and receiving network data from one or more gateways, the topology system logic may generate the exemplary visualizations described above, and those shown in the accompanying drawings, that illustrate the flow of network traffic associated with one or more tagged constructs. As is noted throughout, the illustrated flow of network traffic may correspond to constructs deployed in multiple cloud networks. Such operability provides numerous advantages to users over the current art by enabling users to tag one or more gateways residing in different public cloud networks with meaningful tags and search for construct parameters, construct status, link status and the flow of network traffic corresponding to that tag.

An additional functionality of the topology system logic is the generation of visualizations that illustrate changes to aspects of the network managed by the controller over time. For example and as discussed below, the topology system logic may store the received data pertaining to the network (the network data and the construct metadata) for given points in time, e.g., $t_1 \rightarrow t_i$ (where i>1). Upon receiving user input corresponding to a request to display the changes between two points in time, e.g., $t_1$ and $t_2$, the topology system logic compares the stored data for $t_1$ and $t_2$, and generate a visual that highlights the change(s) between the network at $t_1$ and $t_2$. The term "highlight" may refer to any visual indicator or combination of visual indicators, such as color-coding constructs having changed parameters, varying the size of constructs having changed parameters, displaying a graphic (e.g., a ring) around constructs having changed parameters, displaying a window or other image that lists the detected changes in state of the network, which may spanning multiple public cloud networks, between time $t_1$ and time $t_2$, or other types of visual indicators.

I. Terminology

In the following description, certain terminology is used to describe features of the invention. In certain situations, the term "logic" is representative of hardware, firmware, and/or software that is configured to perform one or more functions. As hardware, the logic may include circuitry having data processing or storage functionality. Examples of such circuitry may include, but are not limited or restricted to a microprocessor, one or more processor cores, a programmable gate array, a microcontroller, an application specific integrated circuit, wireless receiver, transmitter and/or transceiver circuitry, semiconductor memory, or combinatorial logic.

Alternatively, or in combination with the hardware circuitry described above, the logic may be software in the form of one or more software modules. The software module(s) may include an executable application, an application programming interface (API), a subroutine, a function, a procedure, an applet, a servlet, a routine, source code, a shared library/dynamic load library, or one or more instructions. The software module(s) may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code may be stored in persistent storage.

The term "computerized" generally represents that any corresponding operations are conducted by hardware in combination with software and/or firmware.

The term "construct" may be construed as a virtual or physical logic directed to a particular functionality such as a gateway, virtual private cloud network (VPC), sub-network, or the like. For instance, as an illustrative example, the construct may correspond to virtual logic in the form of software (e.g., a virtual machine), which may assign a device-specific address (e.g., a Media Access Control "MAC" address) and/or an IP address within an IP address range supported by to a particular IP subnet. Alternatively, in some embodiments, the construct may correspond to physical logic, such as an electronic device that is communicatively coupled to the network and assigned the MAC and/or IP address(es). Examples of electronic devices may include, but are not limited or restricted to a personal computer (e.g., desktop, laptop, tablet or netbook), a mobile phone, a standalone appliance, a sensor, a server, or an information routing device (e.g., a router, bridge router ("brouter"), etc.). It is contemplated that each construct may constitute at least logic residing as part of a public network, although certain constructs may be deployed as part of an "on-premises" (or local) network.

The term "gateway" may refer to a software instance deployed within a public cloud network or a virtual private cloud network deployed with the public cloud network and controls the flow of data traffic within and from the public cloud network (e.g., to one or more remote sites including computing devices that may process, store and/or continue the routing of data). Herein, each gateway may operate as a "transit gateway" or "spoke gateway," which are gateways having similar architectures but are identified differently based on their location/configurations within a cloud computing environment. For instance, a "spoke" gateway is configured to interact with targeted instances while a "hub" gateway is configured to further assist in the propagation of data traffic (e.g., one or more messages) directed to a spoke gateway or a computing device within an on-premises network.

The term "network traffic metrics" may refer to measurements of network traffic transmission including amount, frequency and/or latency. In some embodiments, network traffic metrics may include identification of a source and/or destination (e.g., IP address, originating/destination gateway, originating/destination VPC, originating/destination geographic region, etc.). Further, in some embodiments, network traffic metrics may also refer to analyses performed on and/or filtering of measurements of network traffic transmission.

The term "controller" may refer to a software instance deployed within a cloud computing environment (e.g., resources of a public cloud network) that manages operability of certain aspects of one or more cloud computing environments spanning across different public cloud networks (multi-cloud network). For instance, a controller may be configured to collect information pertaining to each VPC and/or each gateway instance and configures one or more routing tables associated with one or more VPCs and/or gateway instances spanning a multi-cloud network to establish communication links (e.g., logical connections) between different sources and destinations. These sources and/or destinations may include, but are not restricted or limited to on-premises computing devices, gateway instances or other types of cloud resources.

The term "message" generally refers to information in a prescribed format and transmitted in accordance with a suitable delivery protocol. Hence, each message may be in the form of one or more packets, frames, or any other series of bits having the prescribed format.

The term "link" may be generally construed as a physical or logical communication path between two or more constructs. For instance, as a physical communication path, wired and/or wireless interconnects in the form of electrical wiring, optical fiber, cable, bus trace, or a wireless channel using infrared, radio frequency (RF), may be used. A logical communication path includes any communication scheme that enables information to be exchanged between multiple constructs Finally, the terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described

II. General Architecture—Topology System

Referring to FIG. 1, a diagram of an exemplary embodiment of a distributed cloud management system 100 is shown, where the cloud computing system features a controller 102 for managing constructs residing in multiple cloud networks and a software instance 138 to visualize the managed constructs (hereinafter, "topology system logic"). More specifically, the controller 102 is configured to manage multiple constructs spanning multiple cloud networks, such as cloud (network) A 104 and cloud (network) B 106. In the exemplary illustration, cloud A 104 provides computing resources ("resources") for a transit gateway 114 in communication with gateways 118₁-118₂ associated with virtual networks (VNETs) 116₁-116₂. Cloud B 106 provides resources for a transit gateway 120 in communication with gateways 124₁-124₂ associated with virtual private clouds (VPCs) 122₁-122₂. Cloud B 106 further provides resources for a native transit hub 126 in communication with VPCs 128 and 130. According to this embodiment of the disclosure, as shown in FIG. 1, the transit gateways 114, 120 and the native transit hub 126 are in communication with each other. Thus, as should be clearly understood that the controller 102 is managing several constructs, such as the illustrated gateways, that span multiple cloud networks.

Specifically, a first grouping of constructs 108 is deployed within the Cloud A 104, and second and third groupings of constructs 110, 112 are deployed within Cloud B 106. The controller 102 utilizes a set of APIs to provide instructions to and receive data (status information) associated with each of these constructs as well as status information pertaining to each connection between these constructs (link state). The construct metadata returned by a construct may depend on the type of construct (e.g., regions, VPCs, gateway, subnets, instances within the VPCs, etc.), where examples of construct metadata may include, but is not limited or restricted to one or more of the following construct parameters (properties): construct name, construct identifier, encryption enabled, properties of the VPC associated with that construct (e.g. VPC name, identifier and/or region, etc.), cloud properties in which the construct is deployed (e.g., cloud vendor in which the construct resides, cloud type, etc.), or the like.

Additionally, the cloud management system 100 includes topology system logic 138 processing on cloud computing resources 136. In some embodiments, the topology system logic 138 may be logic hosted on a user's Infrastructure as a Service (IaaS) cloud or multi-cloud environment. As one example, the topology system logic 138 may be launched as an instance within the public cloud networks (e.g., as an EC2® instance in AWS®). As an alternative example, the topology system logic 138 may be launched as an virtual machine in AZURE®. When launched, the topology system logic 138 is assigned a routable address such as a static IP address for example.

As shown, the topology system logic 138 is in communication with the controller 102 via, for example, an API that enables the topology system logic 138 to transmit queries to the controller 102 via one or more API calls. The topology system logic 138, upon execution by the cloud computing resources 136, performs operations including querying the controller 102 via API calls for construct metadata in response to a particular event. The particular event may be in accordance with a periodic interval or an aperiodic interval or a triggering events such as a user request for a visualization via user input.

In some embodiments, in response to receiving a query via an API call from the topology system logic 138, the controller 102 accesses data stored on or by the controller 102 and returns the requested data via the API to the topology system logic 138. For example, the topology system logic 138 may initiate one or more queries to the controller 102 to obtain topology information associated with the constructs managed by the controller 102 (e.g., a list of all gateways managed by the controller 102, a list of all VPCs or VNETs managed by the controller 102, or other data gathered from database tables) along with status information associated with each construct as described above.

Upon receiving the requested construct metadata, the topology system logic 138 performs one or more analyses and determines whether any additional construct metadata needs to be requested. For example, the topology system logic 138 may provide a first query to the controller 102 requesting a list of all gateways managed by the controller 102. In response to receiving the requested construct metadata, the topology system logic 102 determines the interconnections between the gateways listed. Subsequently, the topology system logic 138 may provide a second query to the controller 102 requesting a list of all VPCs managed by the controller. In response to receiving the requested construct metadata, the topology system logic 138 determines the associations between each VPC and a corresponding gateway.

For example, in some embodiments, the received construct metadata provides detailed information for each gateway enabling the topology system logic 138 to generate a data object, e.g., a database table of the construct metadata, that represents a gateway. The data object representing the multiple gateways are cross-referenced to build out a topology mapping based on the parameters of each gateway, which may include, inter alia: cloud network user account name; cloud provider name; VPC name; gateway name; VPC region; sandbox IP address; gateway subnet identifier; gateway subnet CIDR; gateway zone; name of associated cloud computing account; VPC identifier; VPC state; parent VPC name; VPC CIDR; etc. Similarly, the construct metadata is also utilized to generate a data object representing each VPC object and each subnet object.

Additionally, in order to determine whether a connection within the network is between two transit gateways, a separate API call may be utilized by the topology system logic 138 to query the controller 102 for a listing of all transit gateways. Thus, the topology system logic 138 is then able to determine whether a connection between a first gateway and a second gateway is between two transit gateways. In some embodiments, as will be discussed below, the connections between transit gateways and the connections between a spoke gateway and a transit may be represented visually in two distinct methods.

In addition to receiving the construct metadata from the controller 102, the topology system logic 138 may also receive network data from one or more gateways managed by the controller 102. For example, the network data may include for each network packet, but is not limited or restricted to, an ingress interface, a source IP address, a destination IP address, an IP protocol, a source port for UDP or TCP, a destination port for UDP or TCP, a type and code for ICMP, an IP "Type of Service," etc. In one embodiment, the network data may be transmitted to the topology system logic 138 from a gateway using an IP protocol, for example, UDP. In some embodiments, the network data is collected and exported via the NetFlow network protocol.

In order to configure a gateway to transmit the network data to the topology system logic 138, the topology system logic 138 may provide instructions to the controller 102, which in turn provides the instructions to each gateway managed by the controller 102. The instructions provide the IP address of the topology system logic 138, which is used as the IP address for addressing the transmission of the network data.

As will be discussed in detail below, the topology system logic 138 may generate a visualization platform comprising one or more interactive display screens. These display screens may include a dashboard, a topology mapping and a network flow visualization. Additionally, the visualization platform may be configured to receive user input that causes filtering of the of the displayed data.

For example and still with reference to FIG. 1, the topology system logic 138 may generate a topology mapping visualization of the connections linking the constructs detected by the controller 102, which are illustrated by the constructs within a logical region 132 represented by Cloud A 104 and Cloud B 106. Additionally, the topology system logic 138 may generate various graphical user interfaces (GUIs) that illustrates network traffic flows, traffic flow heat maps, packet capture, network health, link latency, encryption, firewalls, etc., of network traffic flowing between, to and from constructs managed by the controller 102 as illustrated by a second logical region 134.

Embodiments of the disclosure offer numerous advantages over current systems that provide a dashboard illustrating parameters of a controller as current systems do not provide the ability to visualize connections between constructs deployed across multiple cloud networks, the state of resources and connections between resources for multiple clouds and the flow of network data through constructs spanning multiple clouds. As one example, an enterprise network may utilize resources deployed in a plurality of cloud networks and an administrator of the enterprise network may desire to obtain visualization of the status of all constructs and connections associated with these resources. However, because the enterprise network spans multiple cloud networks, conventional systems fail to provide such a solution. By merely obtaining a textual representation of a status of each construct within a single cloud (e.g., through a command line interface), an administrator is unable to obtain a full view of the constructs, connections therebetween and the status of each for the entire enterprise network. Further, detection of anomalous or malicious network traffic patterns may not be detectable in the manner provided by current systems.

As used herein, a visualization (or visual display) of the constructs, connections therebetween and the status of each is referred to as a topology mapping. Current systems fail to provide a topology mapping across multiple cloud networks and fail to allow an administrator to search across multiple cloud networks or visualize how changes in a state of a construct or connection in a first cloud network affects the state of a resource or connection in a second cloud network. In some embodiments, the topology mapping may automatically change as a state of a construct or connection changes or upon receipt of construct metadata updates in response to certain events such as at periodic time intervals (e.g., a "dynamic topology mapping").

In some embodiments, a network may be deployed across multiple cloud networks using a plurality of controllers to manage operability of the network. In some such embodiments, each controller may gather the information from the network and constructs which it manages and a single controller may obtain all such information, thereby enabling the visualization platform to provide visibility across a network (or networks) spanning multiple controllers.

Figure 2A:
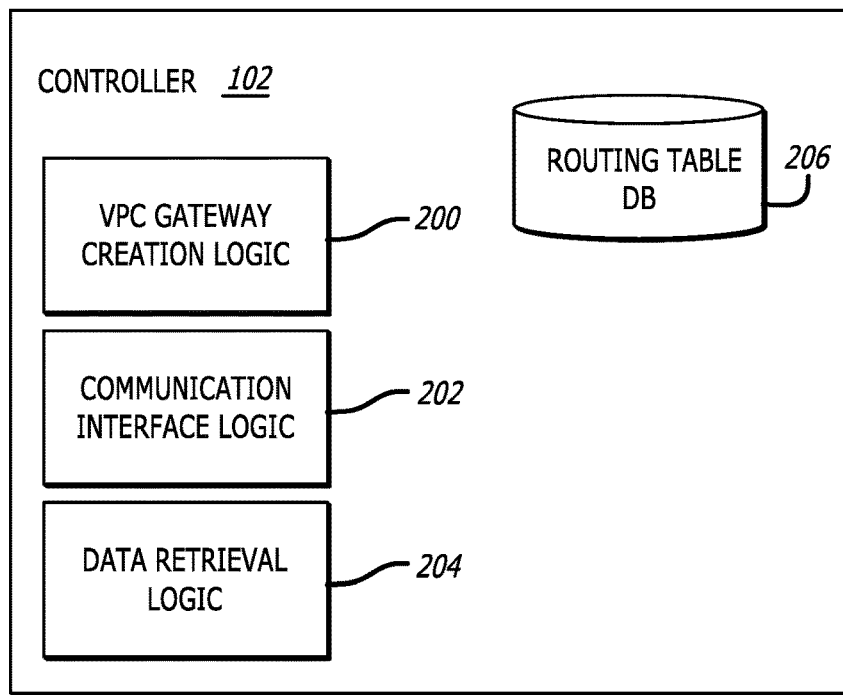
FIG. 2A is an exemplary illustration of a logical representation of a controller deployed within a cloud computing platform in accordance with some embodiments.

Referring to FIG. 2A, an exemplary illustration of a logical representation of the controller 102 deployed within the cloud management system 100 is shown in accordance with some embodiments. The controller 102, as noted above, may be a software instance deployed within the cloud network to assist in managing operability of constructs within multiple public cloud networks. According to this embodiment, the controller 102 may be configured with certain logic modules, including, a VPC gateway creation logic 200, a communication interface logic 202 and a data retrieval logic 204. The controller 102 may also include a routing table database 206.

In some embodiments, the gateway creation logic 200 performs operations to create a gateway within a VPC including creating a virtual machine within a VPC, provide configuration data to the virtual machine, and prompt initialization of the gateway based on the configuration data. In one embodiment in which the cloud computing resources utilized are AWS®, the VPC gateway creation logic 200 launches a virtual machine within a VPC, the virtual machine being an AMAZON® EC2 instance. The virtual machine is launched using a pre-configured virtual machine image published by the controller 102. In the particular embodiment, the virtual machine image is an Amazon Machine Image (AMI). When launched, the virtual machine is capable of receiving and interpreting instructions from the controller 102.

The communication interface logic 202 may be configured to communicate with the topology system logic 138 via an API. The controller 102 may receive queries from the topology system logic 138 via one or more API calls and respond with requested data via the API.

The data retrieval logic 204 may be configured to access each construct managed by the controller 102 and obtain construct metadata therefrom. Alternatively, or in addition, the data retrieval logic 204 may receive such construct metadata that is transmitted (or "pushed") from the constructs without the controller 102 initiating one or more queries (e.g., API calls).

The routing table database 206 may store VPC routing table data. For example, the controller 102 may configure a VPC routing table associated with each VPC to establish communication links (e.g., logical connections) between a transit gateway and cloud instances associated with a particular instance subnet. A VPC routing table is programmed to support communication links between different sources and destinations, such as an on-premise computing devices, a cloud instance within a particular instance subnet or the like. Thus, the controller 102 obtains and stores information that reveals certain properties of resources (e.g., constructs such as gateways, subnets, VPCs, instances within VPCs, etc.) within the purview of the controller 102 as well as status information pertaining to the connections (communication links) between with these resources.

Figure 2B:
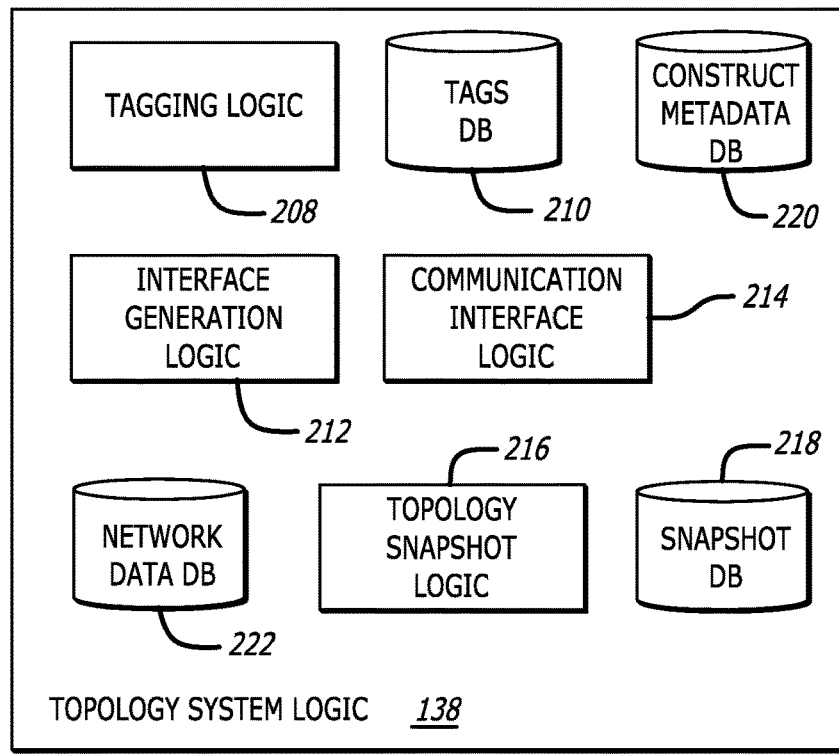
FIG. 2B, an exemplary illustration of a logical representation of the topology system logic deployed within a cloud computing platform in accordance with some embodiments.

Referring to FIG. 2B, an exemplary illustration of a logical representation of the topology system logic 138 deployed within a cloud computing platform is shown in accordance with some embodiments. The topology system logic 138 may be a software instance deployed using the cloud computing resources 136 and is configured to communicate with the controller 102 and each of the gateways managed by the controller 102. The topology system logic 138 is configured with certain logic modules, including, a tagging logic 208, a tags database 210, an interface generation logic 212, a communication interface logic 214, a topology snapshot logic 216. Additionally, the topology system logic 138 may include a snapshot database 218, a construct metadata database 220 and a network data database 222.

In some embodiments, the tagging logic 208, upon execution by one or more processors, performs operations as discussed below with respect to FIGS. 4A-5A and 7A-7B. In some embodiments, the tags generated by the tagging logic 208 may be stored in the tags database 210.

In some embodiments, the interface generation logic 212, upon execution by one or more processors, performs operations as discussed below and that cause generation of exemplary interactive user interfaces as illustrated in FIGS. 4A-5G. In some embodiments, the tags generated by the tagging logic 208

In some embodiments, the communication interface logic 214, upon execution by one or more processors, performs operations as discussed herein pertaining to querying a controller for construct metadata, receiving the requested construct metadata and receiving the network data from one or more gateways managed by the controller. In some embodiments, the received construct metadata and network data may be stored in the construct metadata database 220 and the network data database 222 (which may be separate or a combined database).

In some embodiments, the topology snapshot logic 216, upon execution by one or more processors, performs operations as discussed below with respect to FIGS. 4G-4H and 8. In some embodiments, the snapshots (recorded data) generated by the topology snapshot logic 216 may be stored in the snapshot database 218.

III. Exemplary User Interfaces—Topology System Visualization Platform

The exemplary user interfaces illustrated in FIGS. 3A-5G may be configured by the topology system logic 138 to be rendered and displayed on various display screens and via various applications. For example, each of the user interfaces illustrated in FIGS. 3A-5G may be configured to be displayed through a web browser on a computer display screen, a laptop, a mobile device, or any other network device that includes a web browser. Additionally, each of the user interfaces illustrated in FIGS. 3A-5G may be configured to be displayed through a dedicated software application installed and configured to be executed on any of the network devices described above. For example, the topology system logic 138 may be configured to provide the data and user interfaces described herein to a software application (known in the art as an "app") that may be installed and configured to be executed by one or more processors of a network device. Thus, upon execution, the app causes the user interfaces described herein to be rendered on the display screen of the network device (or an associated display screen).

1. Dashboard

Figure 3A:
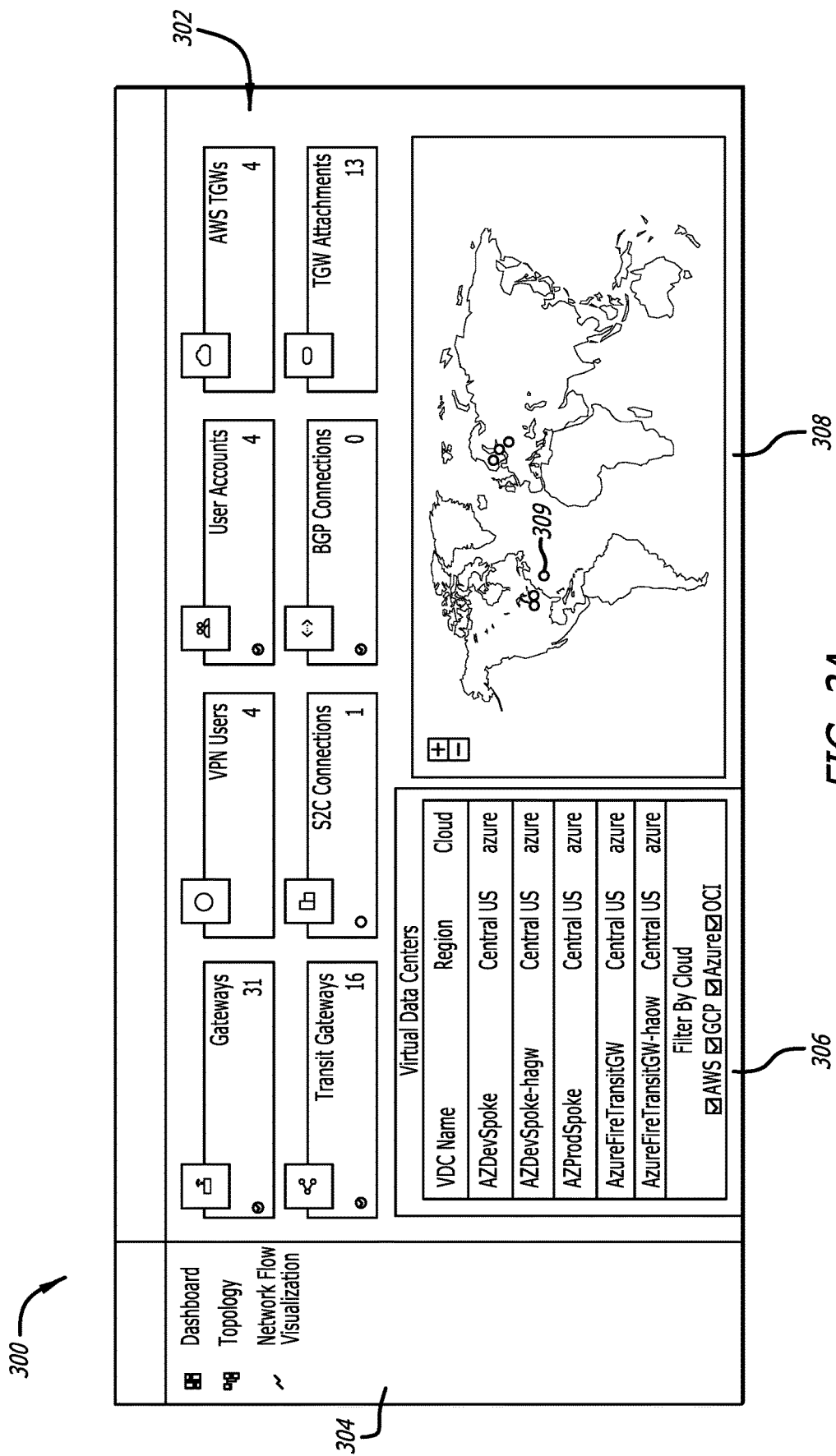
FIGS. 3A-3C are interface screens displaying portions of a dashboard of a visualization platform directed to illustrating information pertaining to network traffic and constructs within a cloud-computing environment according to some embodiments.
Figure 3B:
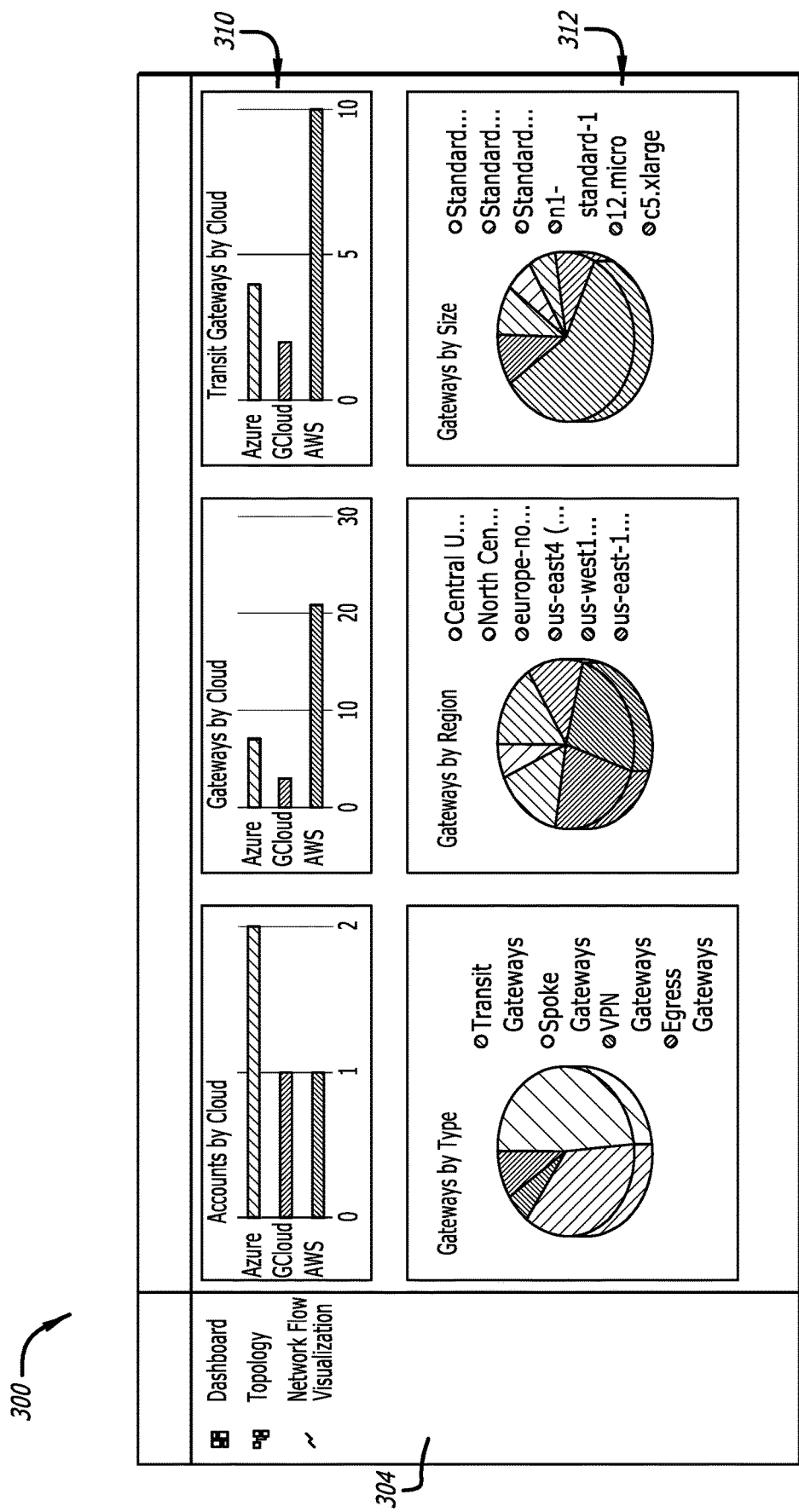
Figure 3C:
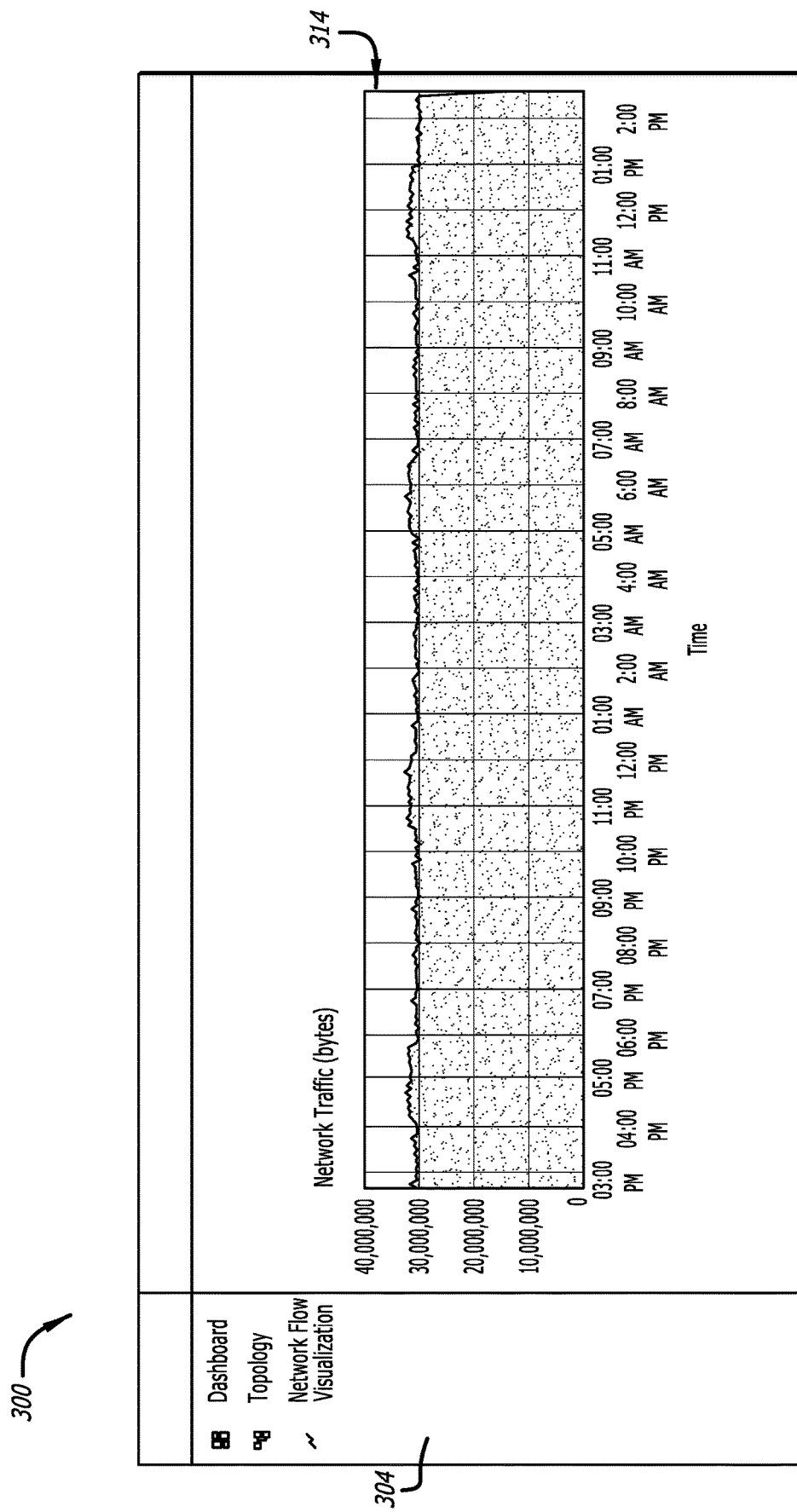

Referring now to FIGS. 3A-3C, graphical user interface (GUI) screens (or "interface screens") displaying portions of a dashboard of a Topology System visualization platform ("visualization platform") with each portion configured to illustrate information obtained or determined by the Topology System are shown according to some embodiments. The interface screens of FIGS. 3A-3C may collectively comprise a "dashboard" 300 that displays various attributes pertaining to a network that is deployed across one or more cloud providers, and notably across multiple cloud providers.

For example, the dashboard 300 as shown in FIG. 3A include several display portions 302, 306, and 308. The navigation panel 304 is also shown as part of the visualization platform generated by the topology system logic 138. The display portion 302 displays information pertaining to constructs managed by a controller, e.g., the controller 102 of FIG. 1, with the constructs deployed in one or more cloud networks. The information displayed may include, but is not limited or restricted to, the number of gateways deployed, the number of current virtual private network (VPN) users, the number of user accounts, the number of transient gateways (TGWs), the number of network connections (optionally filtered according to cloud computing service), the number of Border Gateway Protocol (BGP) connections, etc.

The display portion 306 of FIG. 3A includes a listing of virtual data centers comprising resources of the network, again optionally spanning multiple cloud networks. Specifically, the display portion 306 includes user input fields (e.g., checkboxes) configured to receive user input indicating how whether displayed by the dashboard 300 is filtered by one or more particular cloud networks (e.g., AWS®, GOOGLE® CLOUD PLATFORM® (GCP), AZURE® ORACLE CLOUD INFRASTRUCTURE® (OCI)). In some embodiments, a virtual data center is a pool of cloud computing resources that may be hosted on a public cloud.

Further, display portion 308 illustrates a world map including a graphical representation, e.g., such as the icon 309, for each virtual data center listed in the display portion 306 and a position on the world map to signify its geographical location. The display portion 308 may be filtered in accordance with the selection of "Filter By Cloud" provided in the display portion 306 and may be configured to receive user input to adjust the magnification of the map (e.g., "zoom in" or "zoom out").

The navigation panel 304 includes links to each of the general visualizations provided by the visualization platform including the dashboard 300, the topology mapping 400 (of FIGS. 4A-4E) and network flow visualization 500 (of FIGS. 5A-5G).

Referring now to FIG. 3B, an illustration of a portion of the dashboard 300 displaying a plurality of graphs and charts is shown through a plurality of display portions 310 and 312. Each of the display portions 310 and 312 each display a distribution of resources throughout a multiple cloud deployment.

For instance, as an illustrative embodiment, the display portion 310 features a number of bar graphs illustrating metrics directed to resources managed by the controller; however, as should be understood by review of the drawings accompanying this disclosure, bar graphs are merely one type of illustration that may be utilized to present data and the disclosure is not intended to be so limited to the specific graphical representation types shown. Display portion 310 illustrates that the data displayed on the dashboard corresponds to constructs and network traffic spanning multiple cloud networks by specifically displaying "Accounts by Cloud," "Gateways by Cloud" and "Transit Gateways by Cloud." Similarly, the display portion 312 provides graphical representations directed toward gateway metrics, including "Gateways by Type," "Gateways by Region" and "Gateways by Size." In some embodiments, the gateway metrics include one or more of a total of gateways deployed, a number of virtual private network (VPN) users, a number of user accounts associated with one or more gateways, a number of transit gateways, a number of gateways deployed by a specific cloud computing resource provider, a number of Border Gateway Protocol (BGP) connections, or a number of transient gateway attachments.

FIGS. 3A-3B illustrate various metrics and characteristics of gateways, where the metrics may include one or more of: a total of gateways deployed, a number of virtual private network (VPN) users, a number of user accounts, a number of transit gateways, a number of gateways deployed by a specific cloud computing resource provider, a number of Border Gateway Protocol (BGP) connections, or a number of transient gateway attachments.

Further, one or more metrics may be derived from or based on gateway characteristics, which may include one or more of a cloud computing network in which each gateway is deployed, a type of each gateway, a size of each gateway, or a geographic region in which each gateway is deployed.

Referring now to FIG. 3C, an illustration of another graphical representation of network functionality or operations or operability, based on data gathered and processed by the topology system logic 138 and displayed as part of the dashboard 300, is shown. More specifically, according to this illustrative embodiment, the display portion 314 provides a graphical representation of network traffic between resources spanning multiple cloud networks for an adjustable time period (e.g., 24 hours). The time period may be adjusted by the topology system logic 138 based on receipt of user input. For example, user input may be received corresponding to selection of a portion of the graph shown by the user. In response to such received user input, the topology system logic 138 may alter the graphical representation to target the selected portion that now may be represented by a smaller time interval, e.g., 15 minutes, 30 minutes, one hour, etc.

In some embodiments, the dashboard 300 (and other visualizations discussed in FIGS. 4A-5G) are generated are a result of user input requesting such visualizations. In some embodiments, in response to receiving the request, the topology system logic 138 will request the construct metadata as discussed above, and store the construct metadata and the latest network data received from the gateways in a data store (such as the construct metadata database 220 and/or the network data database 222, which as noted above, may be a single database). Additionally, the topology system logic 138 then generates the requested visualization based on the stored data.

In some embodiments, the topology system logic 138 will automatically update the visualizations (e.g., generate an updated visualization and cause the re-rendering of the display screen) at periodic time intervals (e.g., every 30 seconds, every 1 minute, etc.). In some embodiments, an updated visualization will be generated and displayed upon occurrence of a triggering event, such as receipt of user input requesting a refresh of the display screen. The updated visualizations will be updated based on newly received or obtained construct metadata and/or network data since the previous rendering.

2. Topology Mapping

Referring now to FIGS. 4A-4E, interface screens displaying portions of a topology mapping 400 of the visualization platform generated by the topology system logic 138 are shown according to some embodiments. Specifically, FIGS. 4A-4E illustrate a plurality of constructs that are deployed in one or more cloud networks managed by the controller 102 and connections between various constructs.

Figure 4A:
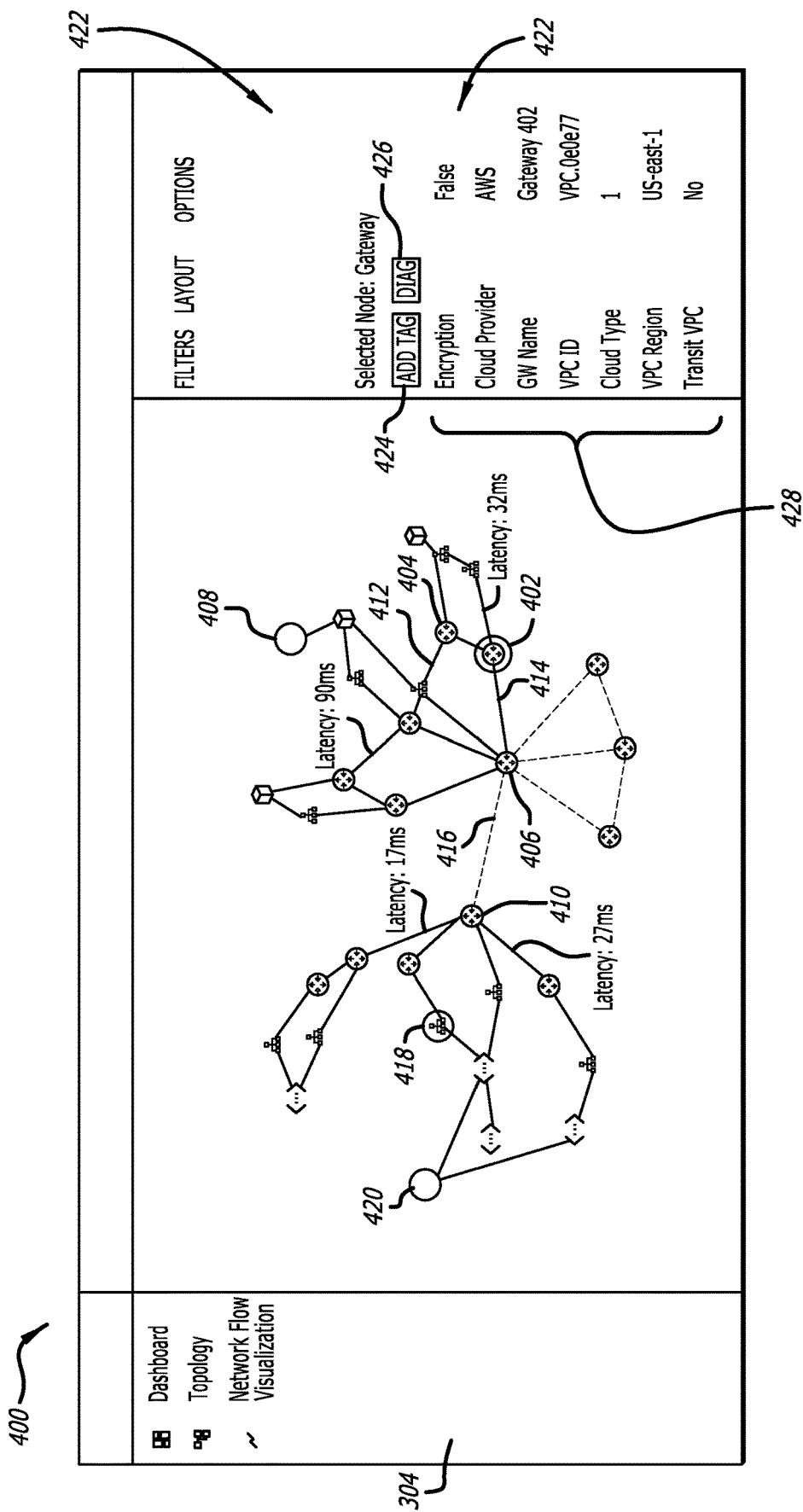
FIGS. 4A-4H are interface screens displaying portions of a topology mapping of a visualization platform directed to illustrating constructs and connections therebetween within a cloud-computing environment according to some embodiments.

Referring to FIG. 4A, an exemplary illustration of a topology mapping 400 generated by the topology system logic 138 is shown in accordance with some embodiments. As shown, the topology mapping 400 includes a graphical representation of the constructs managed by a controller, e.g., the controller 102 of FIG. 1. The topology mapping 400 enables a user to visualize all known constructs, which may be deployed on a single cloud or across multiple cloud networks. In the exemplary illustration, it is seen that the constructs displayed are deployed on a plurality of cloud networks including AZURE®, GCP and AWS®.

The topology mapping 400 is an interactive display screen configured to receive various forms of user input (e.g., drag and reposition of constructs, select construct(s) to view construct parameters, input text, select settings, or activate buttons, etc.). The received user input may be configured reposition constructs, cause a display of construct parameters, apply filters, search for constructs, run diagnostics, apply tag(s), etc.

As illustrated in FIG. 4A, the construct 402, e.g., the gateway 402, is illustrated as being selected. In the embodiment shown, the selection of the gateway 402 results in the display of the parameters of the gateway 402 in the display portion 422. For instance, the display portion 422 may provide the name of the selected construct, "Gateway," (gateway 402) user input buttons 424 and 426 configured to receive user input, and a listing 428 of construct parameters including whether the construct is encrypted, the cloud provider of the construct, the gateway name associated with the construct, the VPC identifier associated with the construct, the cloud type of the construct, the VPC region of the construct, whether the construct is a transit VPC, etc. It should be noted that the construct parameters may correspond to the construct metadata received by the controller 102 as discussed above and is not limited to the parameters illustrated in the drawings. Instead, the disclosure includes all parameters of the selected construct. As is known in the art, a transit VPC operates to connect multiple VPCs and/or remote networks.

The topology mapping 400 also illustrates a plurality of connections between various constructs (e.g., illustrated as nodes or vertices). With reference to the selected gateway 402, several connections (communication links) are illustrated, including but not limited to: link 412 to the gateway 404, link 414 to the transit gateway 406, a link 416 indirectly linking the gateway 402 to the transit gateway 410, etc. Additionally, the varying graphical indicia may indicate a difference in the link. For example, in some embodiments, a solid link may indicate a link between two spoke gateways or a gateway-to-transit gateway link. Additionally, in some embodiments, a dotted line may indicate a link between two transit gateways. Further, in some embodiments, the links may be color-coded to provide a visual indication as to the state of the link, e.g., green for active, and red for inactive.

The topology mapping 400 also illustrates constructs other than a gateway including subnets, such as the subnet 418, and virtual data centers, such as the virtual data centers 408, 420 (e.g., representing an AWS® resource and an AZURE® resource, respectively).

Figure 4B:
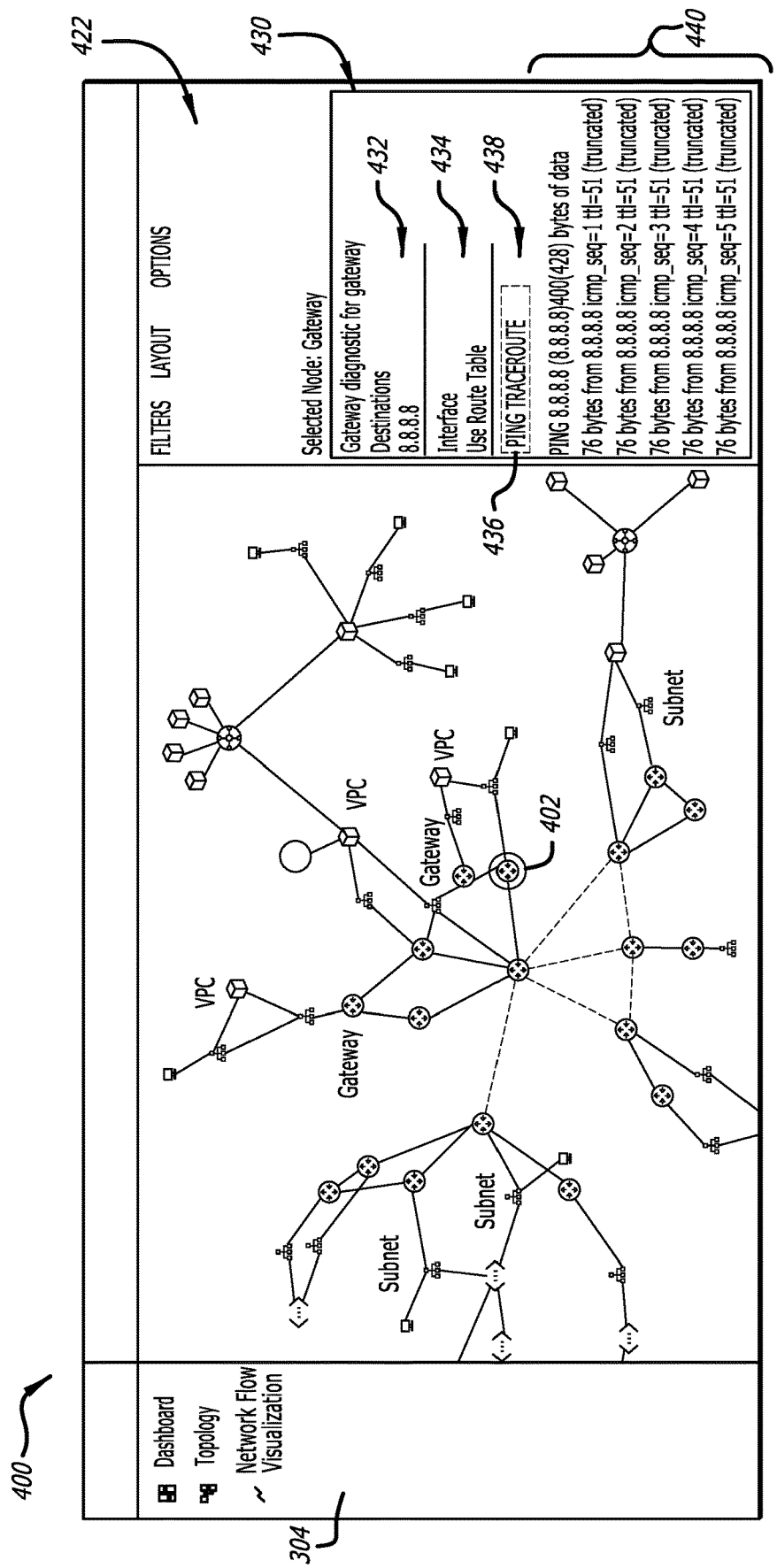

Referring to FIG. 4B, an exemplary illustration of a topology mapping 400 generated by the topology system logic 138 illustrating a diagnostic function is shown in accordance with some embodiments. As shown in FIG. 4A, the topology mapping 400 may display a button 426 (e.g., labeled "diagnostic") configured to receive user input activating the button 26, which causes initiation of a diagnostic procedure to be performed by the topology system logic 138. Upon activation of the button 426, the topology system logic 138 causes rendering of the display box 430, which includes several input fields 432-438 each configured to receive user input that dictates aspects of the diagnostic procedure. As shown, the topology system logic 138 is configured to perform the diagnostic procedure on the selected construct (gateway 402); however, in other embodiments, the display box 430 may include an additional user input field configured to receive a construct on which the diagnostic procedure will be performed (or initiated from).

Additionally, the topology system logic 138 may be configured to provide a value indicating link latency located on or adjacent to one or more of the links illustrated in FIG. 4A. The topology system logic 138 may be configured to automatically send data packets (e.g., a ping) and determine the time the packet spent in transmission by analyzing the time the data packet was sent and the time the data packet was received (included in a response packet from the data packet's destination). The link latency for each link may be updated at periodic intervals, e.g., every 30 seconds, 60 second, etc., or in response to a triggering event (e.g., receipt of user input indicating a refresh of the visual). Although a subset of the links illustrated in FIG. 4A include an indication of link latency, such may be provided for all links. Advantageously, a visual of link latencies may be used by network administrators to reposition constructs (e.g., terminate and re-launch a virtual machine in a different subnet) in order to improve link latencies. Additionally, the visual of link latencies may be utilized to assess non-compliance with certain Quality of Service (QoS) levels (e.g., as set forth in a contract). Further, the topology system logic 138 may set latency thresholds and monitor link latencies such that a notification is generated or alteration of the topology mapping 400 when a link latency meets or exceeds a latency threshold (which may correspond to the certain QoS levels referenced above).

Referring to FIG. 4B, the input fields 432-434 are configured to receive user input of: a destination, and an interface, respectively. Buttons 436-438 are configured to be activated via user input corresponding to selection of a diagnostic procedure of either: a ping, or trace route, respectively. Although not shown, in other embodiments, input fields corresponding to selection of other diagnostic procedures may be provided, including a TCP dump and/or a link latency check, for example. As shown in FIG. 4B, in response to user input activating the button 436 (ping), the topology system logic 138 initiates a procedure in which a ping is transmitted from the selected construct (gateway 402) to the destination address provided in field 432 (e.g., IP address, 8.8.8.8). The result 440 of the ping are illustrated in real-time. Thus, via the diagnostic procedures provided by the topology system logic 138 through the topology mapping 400, a user may be provided with results of various diagnostic procedures performed on constructs spanning multiple cloud networks (e.g., a ping procedure may be performed between a first gateway deployed in a first cloud and a second gateway deployed in a second cloud) with a visual of the results provided via the visualization platform generated by the topology system logic 138.

Figure 4C:
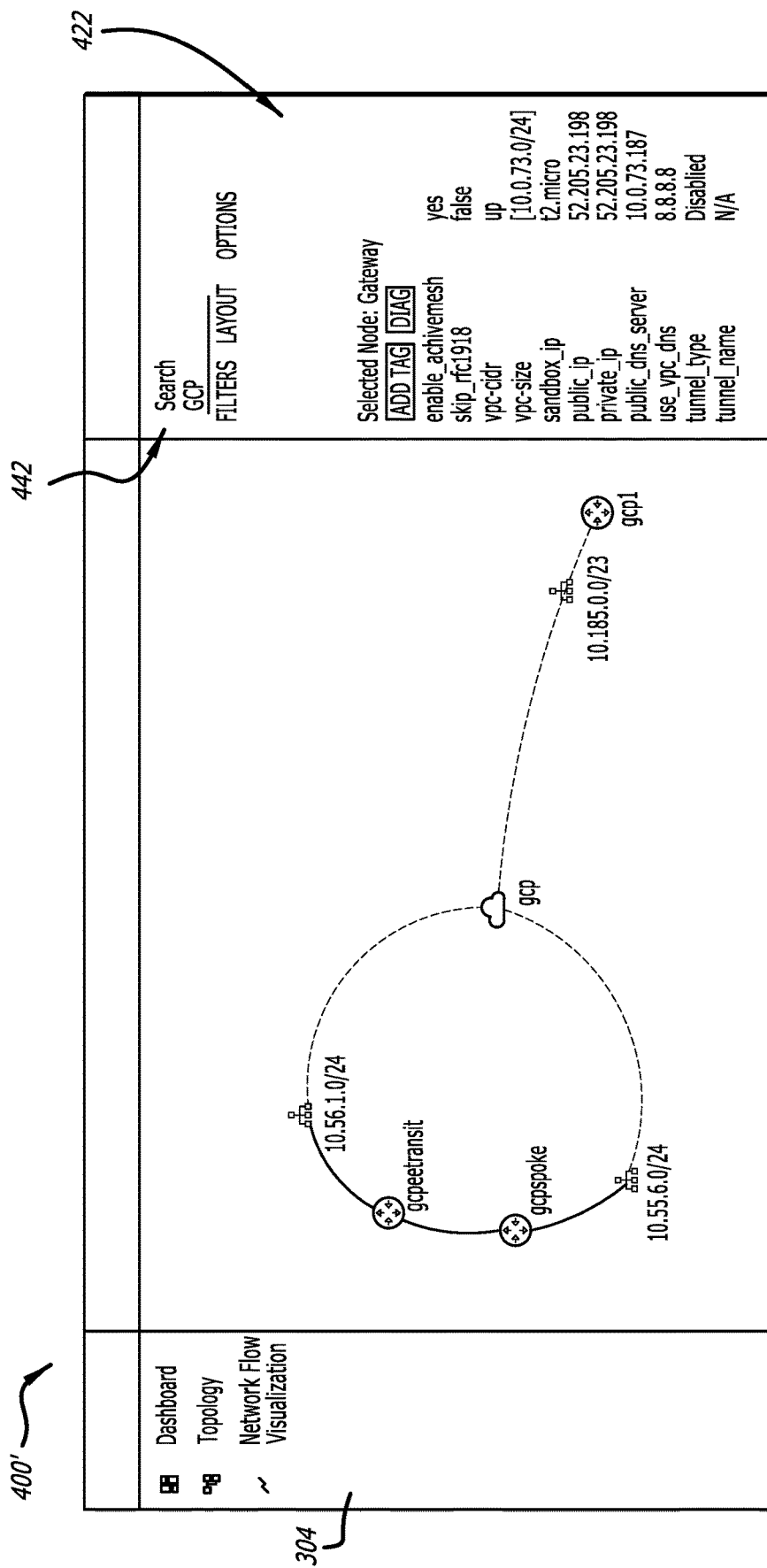

Referring to FIG. 4C, an exemplary illustration of a topology mapping 400' generated by the topology system logic 138 illustrating search and filter functions is shown in accordance with some embodiments. Another functionality provided by the topology system logic 138 a search within the topology mapping 400 and a filter of the displayed constructs based on the received user input, e.g., the search term. As shown, the display portion 422 may include an input field 442, e.g., a text box, configured to receive user input corresponding to a search term. In response to receiving user input at the input field 442, the topology system logic 138 performs a search of the constructs displayed in the topology mapping 400. The search may be of the stored construct metadata, wherein the search includes one or more queries to the construct metadata database 220 of FIG. 2B. The data returned from the one or more queries is then used to generate the topology mapping 400', which is a filtered view of the topology mapping 400 being a display of only the constructs associated with the search term. For example, the search term may correspond to any of the construct parameters discussed above. The topology system logic 138 need not receive a specified parameter but may instead just search all construct parameters within the database 220 for a value corresponding to the search term.

It should be understood that the system of the disclosure may be filtered according to multiple search terms or parameters. Further, it will be understood that, as discussed throughout, the topology system logic 138 advantageously stores the construct metadata for constructs spanning multiple cloud networks. Thus, the filtered view provided as a result of the topology system logic 138 receiving one or more search terms may correspond to a plurality of constructs spanning multiple cloud networks.

Figure 4D:
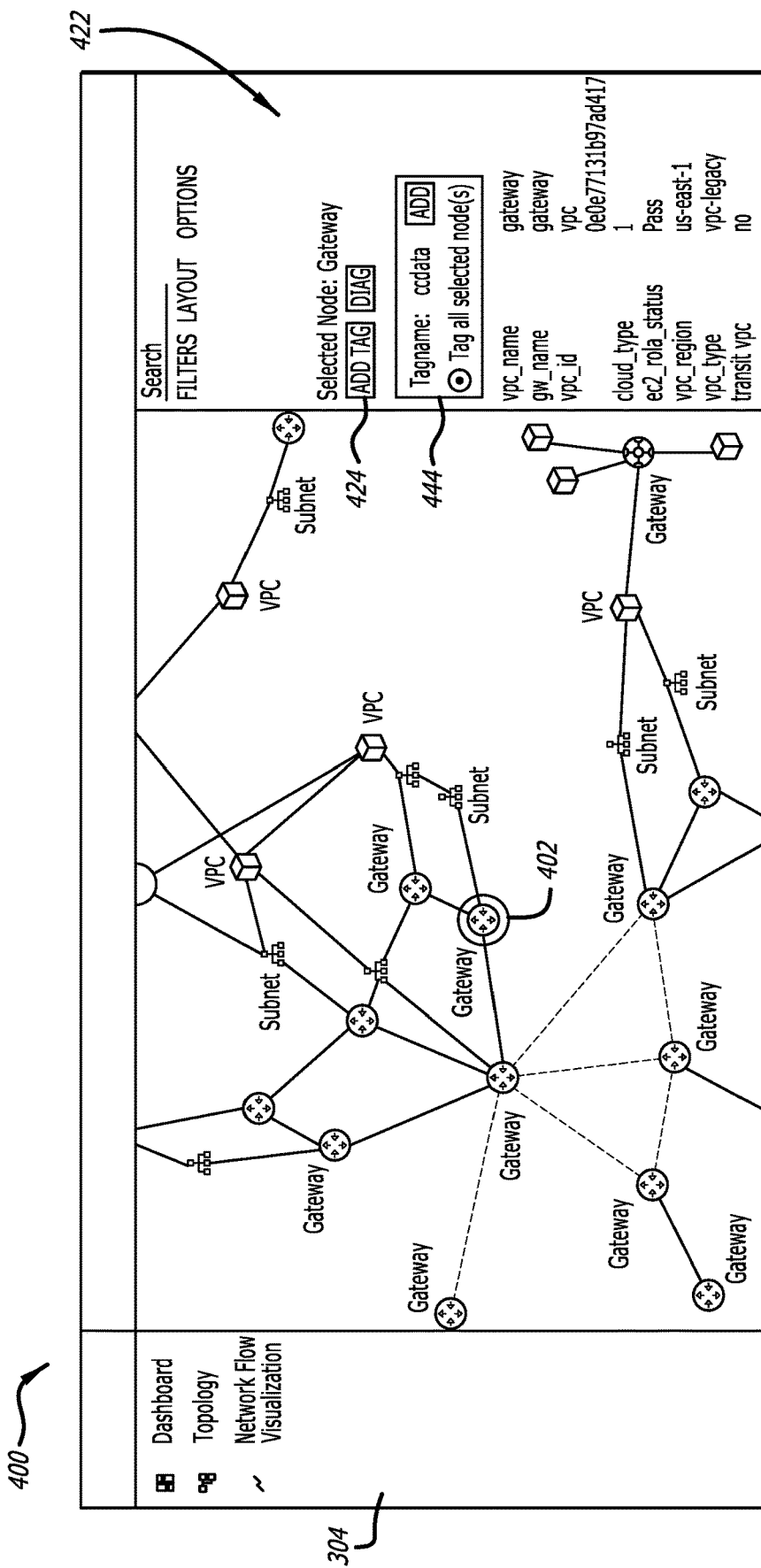

Referring to FIG. 4D, an exemplary illustration of a topology mapping 400 generated by the topology system logic 138 illustrating a tagged construct is shown in accordance with some embodiments. As shown, the display portion 422 includes a user input button 424 (e.g., labeled "Add tag"), which corresponds to tagging function performed by the topology system logic 138. Responsive to receiving user input activating the button 424, a display box 444 is generated by the topology system logic 138 and configured to receive further user input corresponding to a tag (e.g., alphanumeric text) that is to be associated with one or more selected constructs. In the illustrative example of FIG. 4D, a single node, i.e., construct, is selected (gateway 402).

Figure 4E:
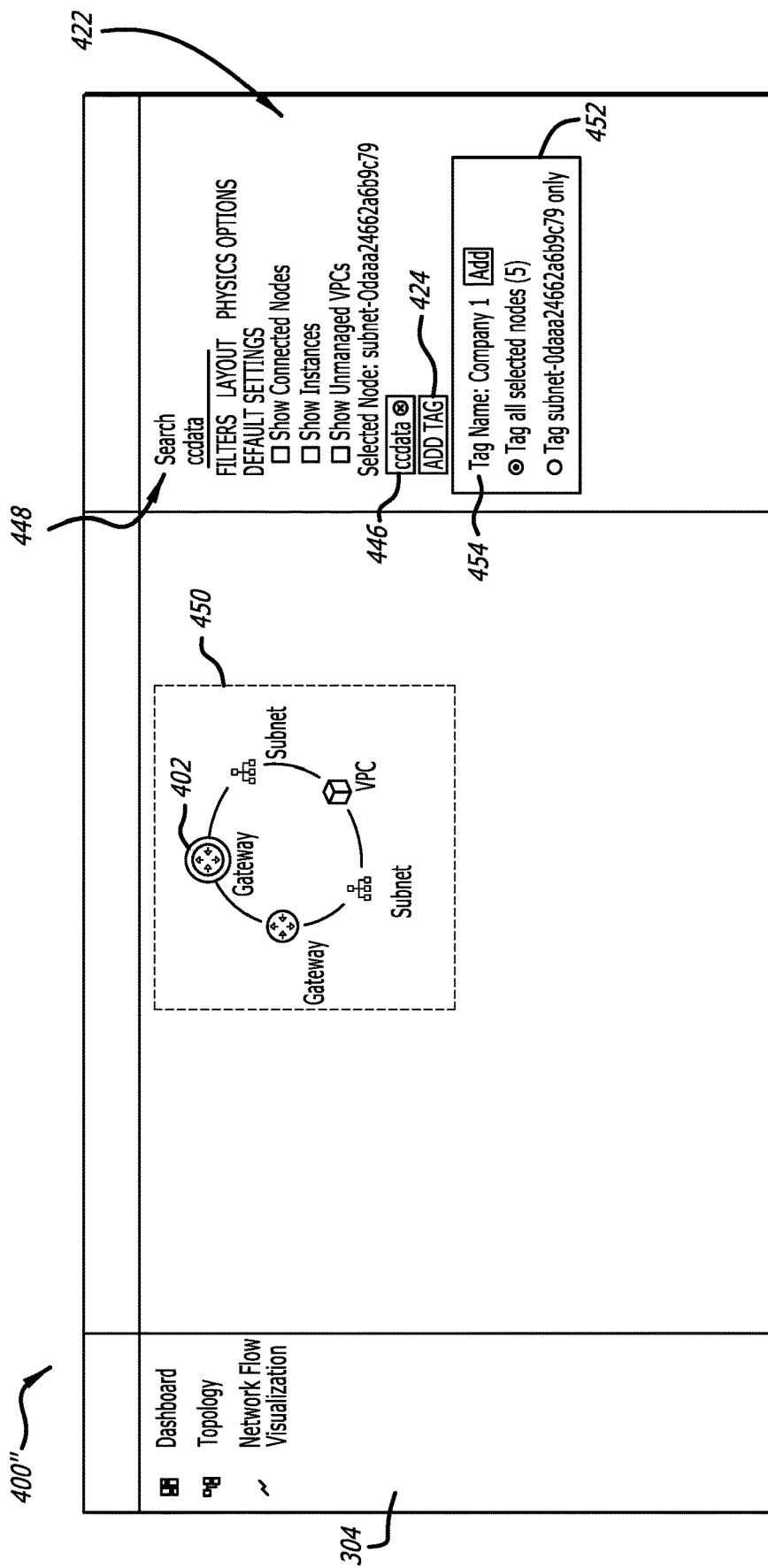

Upon activation of the "add" button via user input included within the display box 444, the tag "ccdata" will be generated and associated with the selected construct, the gateway 402. The generation and association of the tag with the selected includes several operations performed by the topology system logic 138. For example, the topology system logic 138 generates and stores a table, wherein the table may be stored in the tags database 210 of FIG. 2B. The table includes an association of the tag "ccdata" and a unique identifier of each of the selected constructs, a unique identifier of the gateway 402. Therefore, and discussed in more detail below, the tagging of a construct enables a user to search the topology mapping 400 for constructs by their associated tag or tags, which is advantageous to users as they no longer need to remember or search by unique identifiers, which are often long alphanumeric strings. Additionally, when a plurality of constructs are tagged with the same tag, a user may search for the tag, and the topology system logic 138 will in turn generate a display showing the plurality of constructs associated with the tag provided as a search term. In some embodiments, as shown in FIG. 4E, the topology mapping 400 may be filtered to display only the plurality of constructs associated with the tag provided as a search term. However, in other embodiments, although not shown, the entirety of constructs may be displayed while the plurality of constructs associated with the tag provided as a search term are displayed in a visually-different manner than those constructs not associated with the tag (e.g., highlighted, color-coded, etc.).

Referring to FIG. 4E, an exemplary illustration of a topology mapping 400" generated by the topology system logic 138 illustrating the tagging function illustrated in FIG. 4D in conjunction with a search by tag function is shown in accordance with some embodiments. As was discussed above, the topology system logic 138 performs operations to generate a tag based on received user input and associate the tag with one or more selected constructs (e.g., the gateway 402 as discussed with respect to FIG. 4D). In the illustration shown in FIG. 4E, it is assumed that a similar set of operations as discussed in FIG. 4D have been performed and the constructs 450, including the gateway 402, have been tagged with the same tag, e.g., "ccdata."

The topology mapping 400" illustrates a view of the topology mapping 400 where the displayed constructs have been filtered by a search term, "ccdata," as illustrated by the text 448 provided to the display box 422 as user input. Further, upon receiving the text 448 as user input, the topology system logic 138 illustrates the search term in the display box 422 (e.g., search term 446) and further filters the topology mapping 400 to display the topology mapping 400", which illustrates the constructs associated with the search term 446.

As referenced above, the grouping of constructs 450 are assumed to have been tagged with "ccdata"; thus, upon receiving the search term 446 as user input, the topology system logic 138 queries the tags database 210 to retrieve the unique identifier of each construct tagged by with "ccdata." Subsequently, the topology system logic 138 generates and causes display of the topology mapping 400", which includes the grouping of constructs 450.

In addition, FIG. 4E illustrates a second aspect of the tagging functionality of the topology system logic 138, which is to perform operations to tag constructs in a single instance. As shown, the grouping of constructs 450 appear selected via user input. The topology system logic 138 is further configured to tag the selected constructs with the user input provided in the display box 452, the display of which is a result of the activation of the "add tag" button 424, as discussed above. Specifically, the display box 452 is shown to receive the user input 454 (Company 1). Therefore, in response to activation of the "add" button within the display box 452, the topology system logic 138 will generate a tag of "Company 1" and associate each of the constructs within the grouping 450 to the tag of "Company 1."

It should be noted that the illustrated example of FIG. 4E discloses yet another aspect of the tagging functionality of the topology system logic 138, which is that a construct may be associated with multiple tags. As shown, each construct of the grouping 450 is associated with at least two tags: "ccdata" and "Company 1."

It should be understood that a tag is not merely replacing a construct identifier (such as an IP address) but as multiple resources may have the same tag or tags, tagging constructs allows a user to visualize where a specified subset of constructs is deployed throughout the entire network, which may span across multiple cloud networks. As is illustrated in and will be discussed with respect to FIGS. 5A-5G, a search by a tag or tags enables a user to visualize specific network data for constructs associated with the tag or tags.

Figure 4F:
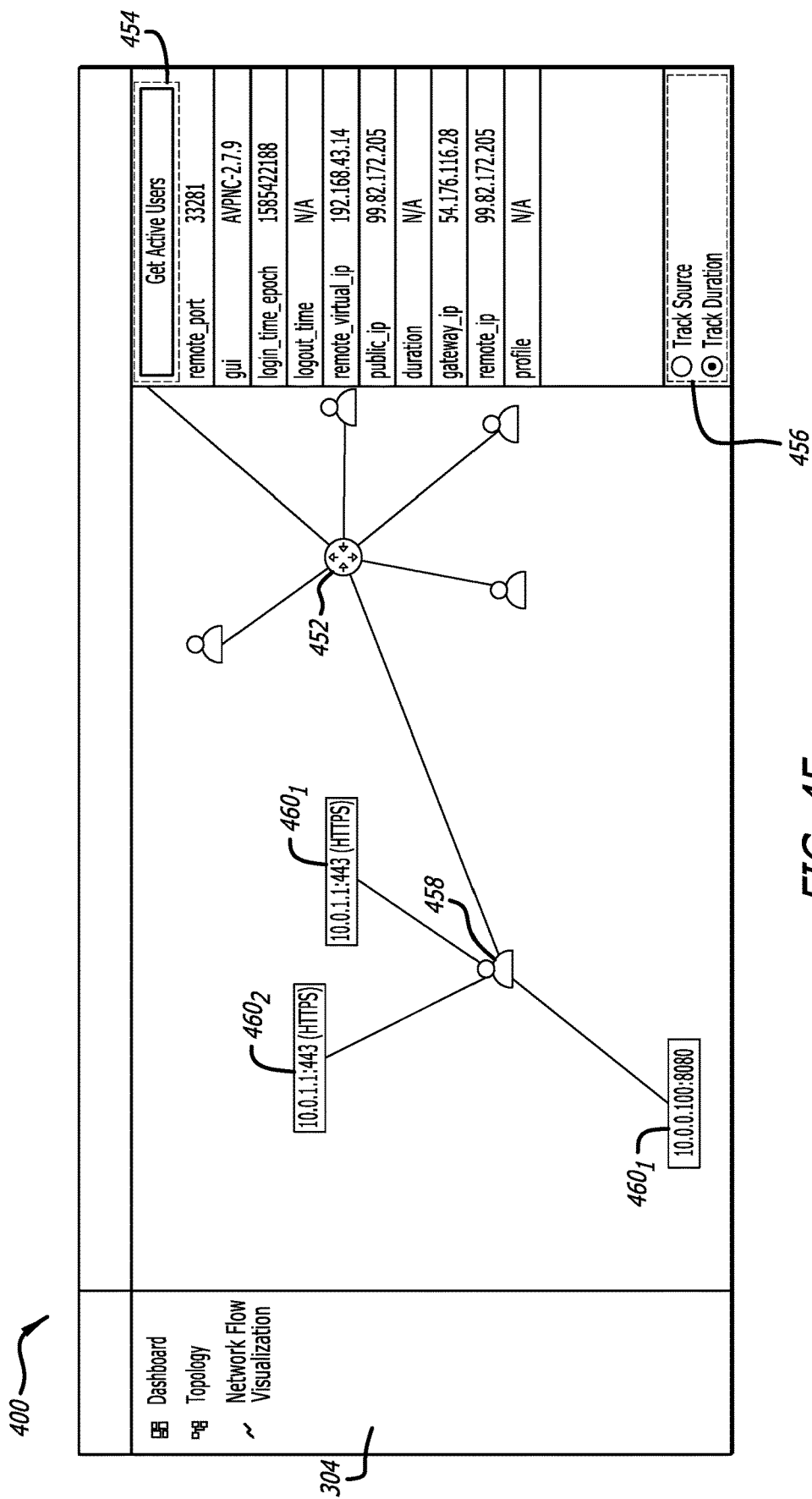

Referring to FIG. 4F, an exemplary illustration of a topology mapping 400 generated by the topology system logic 138 illustrating an active user tracking function is shown in accordance with some embodiments. The view of the "topology" aspect of the topology mapping 400 of FIG. 4F includes the input buttons 454 and a display portion 456. The input button 454 (e.g., labeled "get active users") may be configured to receive user input corresponding to a user request to visualize active users, e.g., associated with a selected gateway such as the gateway 452. An active user may be a user that is logged into a virtual private network (VPN) having access to resources provided be a cloud network. The display portion 456 may be configured to receive user input corresponding to a selection and initiation of a tracking function of a selected active user, e.g., the active user 458, and whether the tracking function is to track network traffic of the selected active user with the selected active user being the source or destination.

More specifically, as part of the construct metadata, the topology system logic 138 receives information pertaining to active users utilizing resources managed by the controller 102. Upon activation of the input button 454 via user input, the topology system logic 138 may query the construct metadata database 220 for active users pertaining to a selected gateway. Upon retrieving the active users of the selected gateway, the topology system logic 138 causes alteration of the topology mapping 400 by displaying a graphical representation of other indicia of the active users associated with the selected gateway. However, in some embodiments, a gateway need not be selected such that the topology system logic 138 retrieves active users for each gateway managed by the controller 102.

In the exemplary embodiment illustrated in FIG. 4F, it is assumed that the gateway 452 is selected and that the input button 454 has been activated via user input. a plurality of active users are shown logged into a VPN associated with the gateway 452 including the active user 458. Further, FIG. 4F illustrates that the display portion 456 has received user input corresponding to a selection of tracking network work such that network traffic having a destination address of the active user 458 will be tracked by the topology system logic 138. Tracking of the network traffic may include the monitoring the source IP address or the destination IP address of each data packet entering or exiting the selected gateway. In some embodiments, the tracked network traffic may be displayed using a graphical representation adjacent and/or connected to the graphical representation of the active user 458. As shown, the tracked network traffic having a destination IP address equal to the IP address of the active user 458 is illustrated via graphical representations $460_1$-$460_3$ with each including the source IP address of the incoming data packet. In alternative embodiments, the tracked network traffic may be provided in a separate display portion adjacent to the topology mapping and/or in a log stored by the topology system logic 138.

Figure 4G:
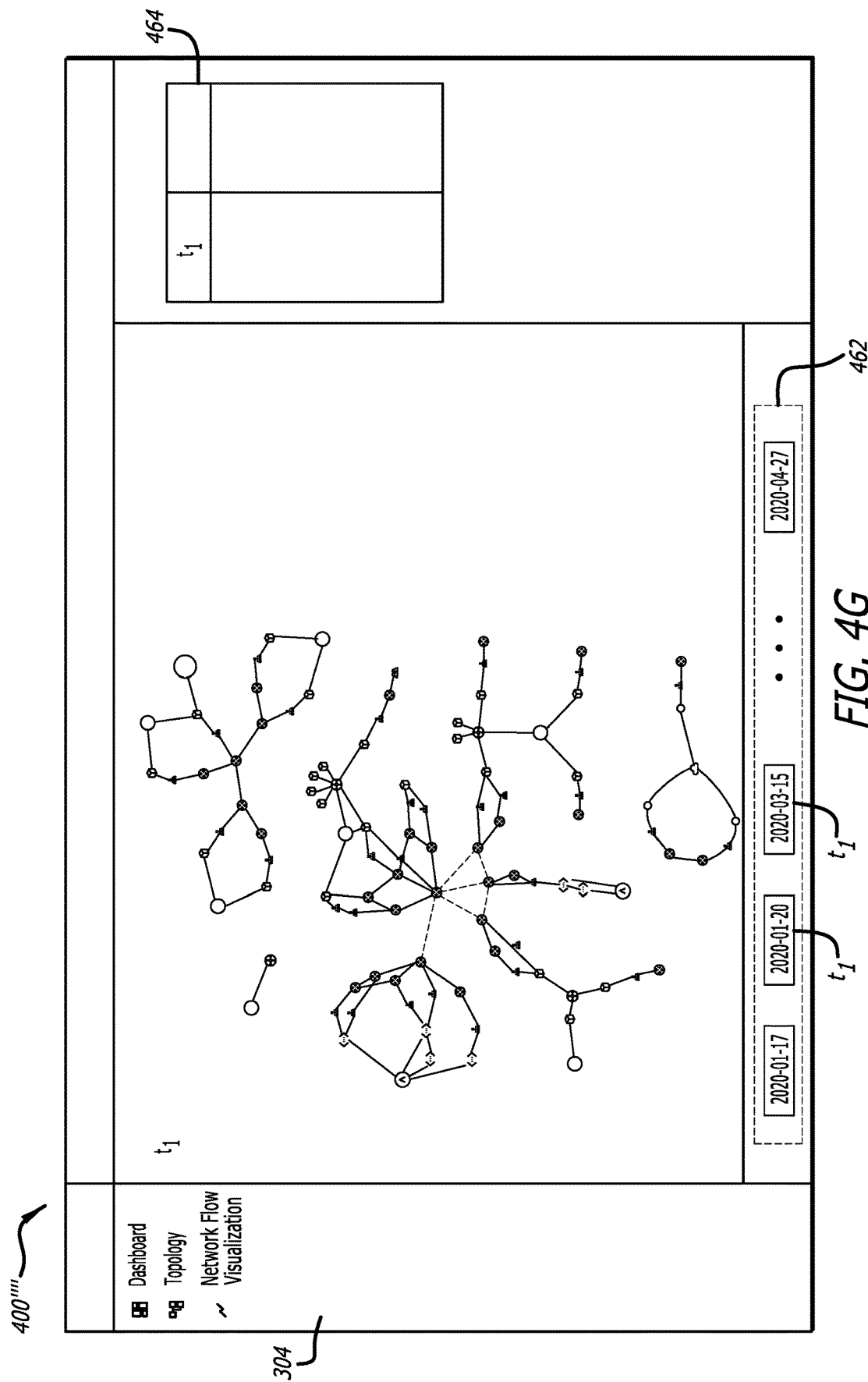
Figure 4H:
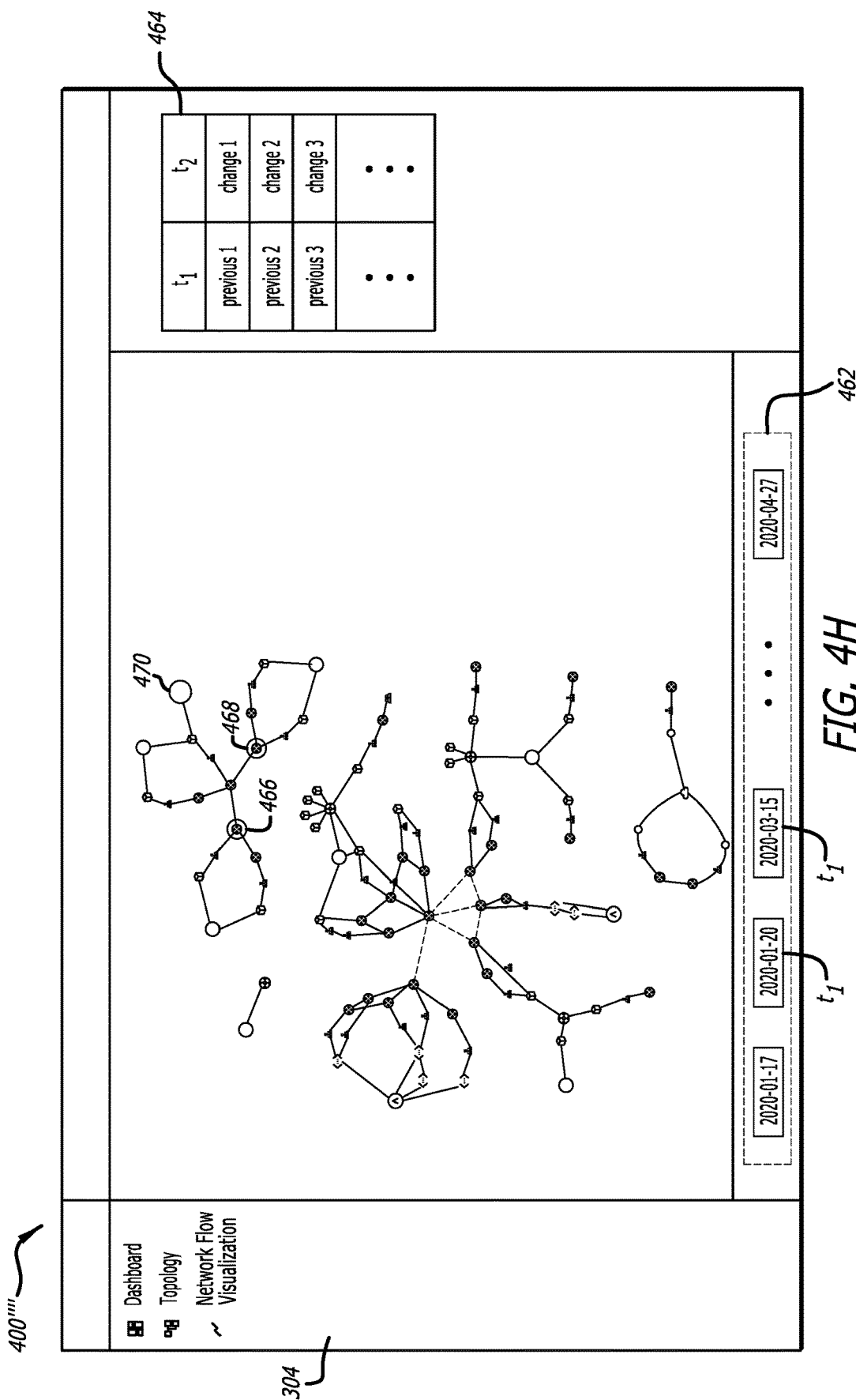

Referring to FIGS. 4G-4H, exemplary illustrations of the topology mappings 400''' and 400'''' generated by the topology system logic 138 illustrating a replay function are shown in accordance with some embodiments. The topology system logic 138 may configured with the functionality to save a state of each construct and connection managed by the controller 102 at a given time instance, either periodically or when user input is received to indicate such a save operation. The record of the state each construct and connections for a given time instance may collectively be referred to as a "snapshot." The state of each construct may include a record of each parameter associated with the construct as discussed herein. Further, the topology system logic 138 may be configured to determine a difference, if applicable, of states for corresponding constructs and corresponding connections between a first snapshot and a second, subsequent snapshot. The topology system logic 138 may then generate an interface screen that illustrates the differences in state.

FIG. 4G illustrates a snapshot of the topology mapping 400 at time instance $t_t$ (the topology mapping 400''') and FIG. 4H illustrates an interface, the topology mapping 400'''', displaying a difference between a snapshot of the topology mapping 400 at time instances $t_t$ and $t_2$. For example, the topology mapping 400∴" provides a visual distinction on constructs 466-470 indicating a change has taken place between the two time instances. Additionally, the display box 464 may be included that provides a listing of the differences by construct.

3. Network Flow Visualization

Referring now to FIGS. 5A-5G, interface screens displaying portions illustrating the flow of network traffic generated by the topology system logic 138 are shown according to some embodiments. Specifically, FIGS. 5A-5G illustrate visualizations representing the flow of network traffic ("network flow visualization 500") among a plurality of constructs that are deployed in one or more cloud networks managed by the controller 102 and connections between various constructs.

As a brief recap, the dashboard 300 discussed above is configured to provided visualizations of the cloud computing environment parameters such as the number of active gateways, number of VPN users, details of the virtual data centers associated with the cloud computing environment managed by a controller, locations of the virtual data centers, etc. Additionally, the topology mapping 400 is configured to provide a visualization of how each construct managed by the controller is connected; thus, providing a visual of interactions of the entire cloud computing environment managed by the controller. Finally, the network flow visualization 500 is configured to provide visualizations of the network traffic flowing among constructs managed by the controller. Therefore, the visualization platform generated by the topology system logic 138 that includes the dashboard 300, the topology mapping 400 and the network flow visualization 500 provides a holistic view of the entire cloud computing environment managed by the controller, which as discussed throughout the disclosure, may span a plurality of cloud networks.

i. Overview

Figure 5A:
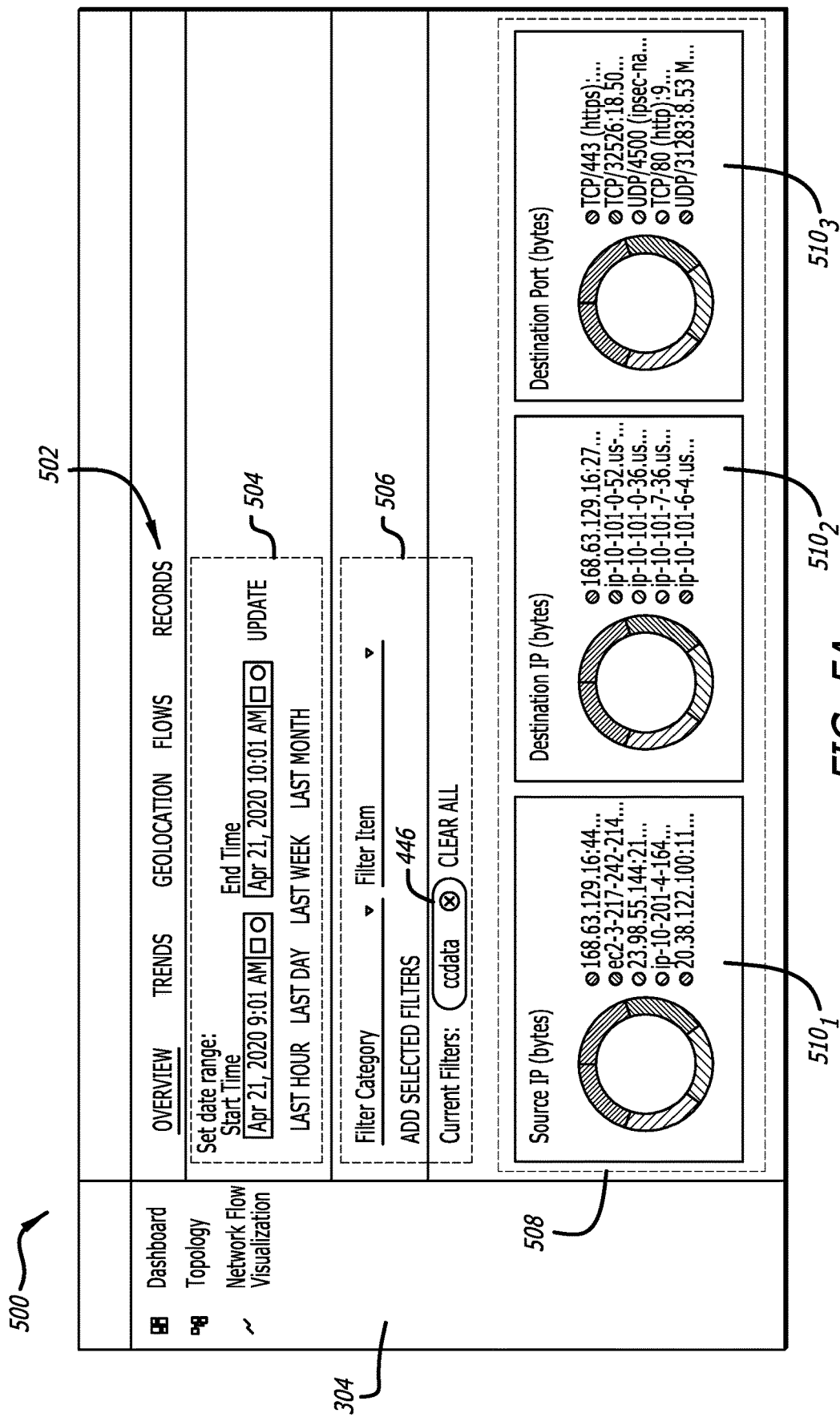
FIGS. 5A-5G are exemplary interface screens displaying portions of an aspect of a visualization platform directed to illustrating information describing the flow of network traffic through one or more constructs within a cloud-computing environment according to some embodiments.

Referring now to FIG. 5A, an exemplary illustration of a visualization of the network flow visualization 500 generated by the topology system logic 138 is shown in accordance with some embodiments. As shown, the network flow visualization 500 includes a plurality of display portions 502-508 with the display portion 508 including a plurality of charts $510_1$-$510_i$ (wherein i≥1). Generally, the network flow visualization 500 is directed to providing various filterable views of how network traffic is flowing (or has flowed) through the cloud computing environment managed by a controller, such as the controller 102 of FIG. 1.

The display portion 502 represents a header for the network flow visualization 500 configured to receive user input corresponding to a selection of a redirection to a particular aspect of the network flow visualization 500 such as: overview, trends, geolocation, flows and records, wherein each will be discussed further below. In particular, the display portion 502 indicates that the "overview" is the aspect of the network flow visualization 500 currently being displayed.

The display portion 504 provides several filtering options directed to time periods for which network traffic flow is to be displayed throughout the network flow visualization 500. For example, the display portion includes input field comprising date selectors configured to receive user input corresponding to a start time and an end time. Additionally, buttons may be provided that enable quick selections via a single click, that upon activation cause the topology system logic 138 to filter the displayed network traffic flow by a predetermined time period, such as but not limited or restricted to: "last hour," "last day," "last week," "last month," etc.

The display portion 506 is configured to provide additional filter options including filter by a specific category such as, but not limited or restricted to, source address, destination address, flow export (host), source port, destination portion, etc., and a corresponding search term ("filter item"). Further, the display portion 506 displays the active filters, when applicable. In the embodiment shown, the filter 446 ("ccdata") previously discussed in FIG. 4E is currently being applied, which corresponds to a filtering of the data illustrated in the charts $510_1$-$510_i$ of the display portion 508.

Importantly, as FIG. 5A illustrates, the tags generated via the topology mapping 400 may be utilized as search terms and applied as filters in the network flow visualization 500. Therefore, a user may provide user input via the topology mapping 400 causing the topology system logic 138 to generate a tag and associate the tag with one or more selected constructs that may be deployed in multiple cloud networks. Further, following the generation and association of the tag, e.g., "ccdata," the topology system logic 138 may receive further user input via the network flow visualization 500 causing the topology system logic 138 to filter the displayed flow of the network traffic and display only the flow of network traffic among (e.g., between, to and from) the constructs tagged with "ccdata."

Figure 5B:
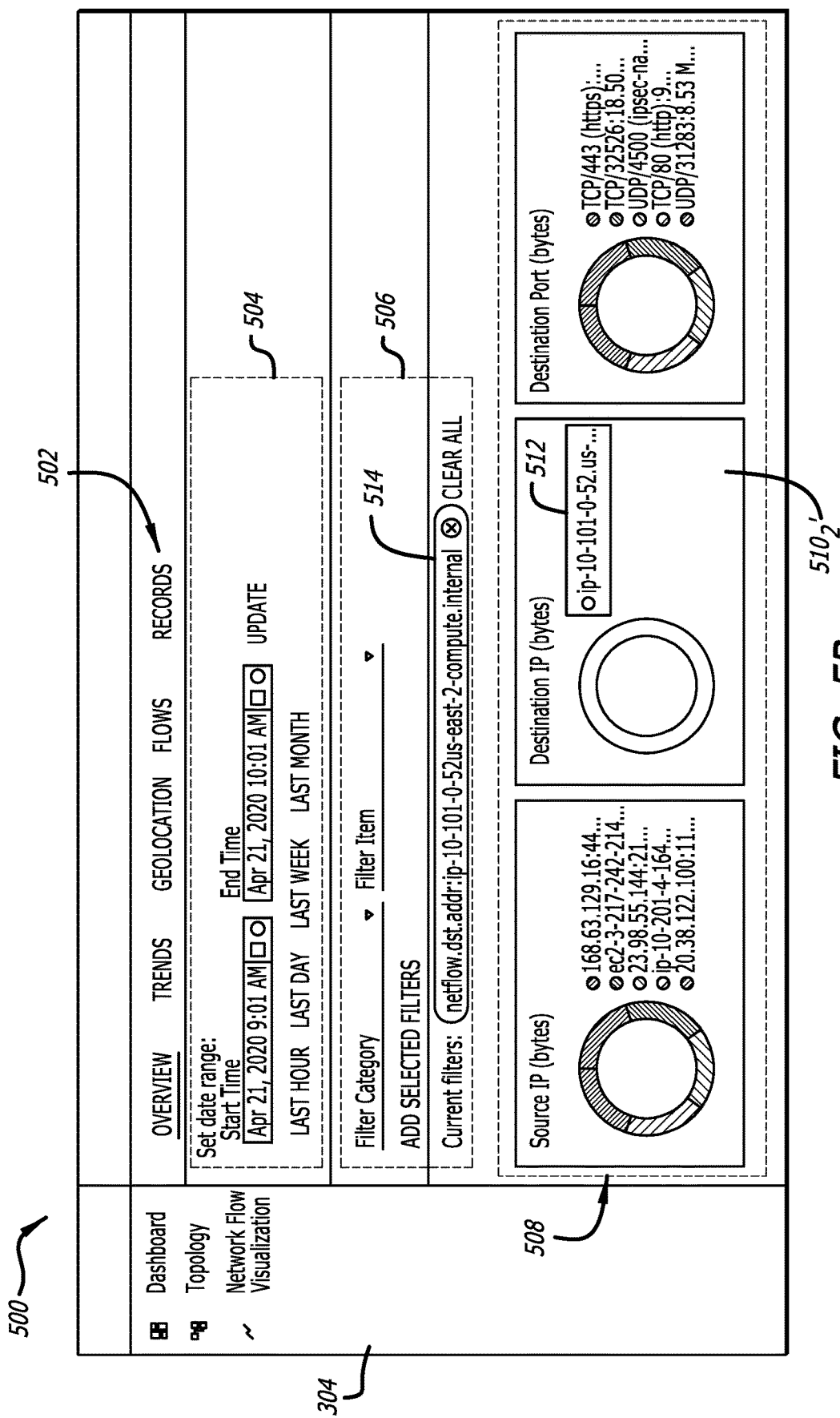
Figure 5C:
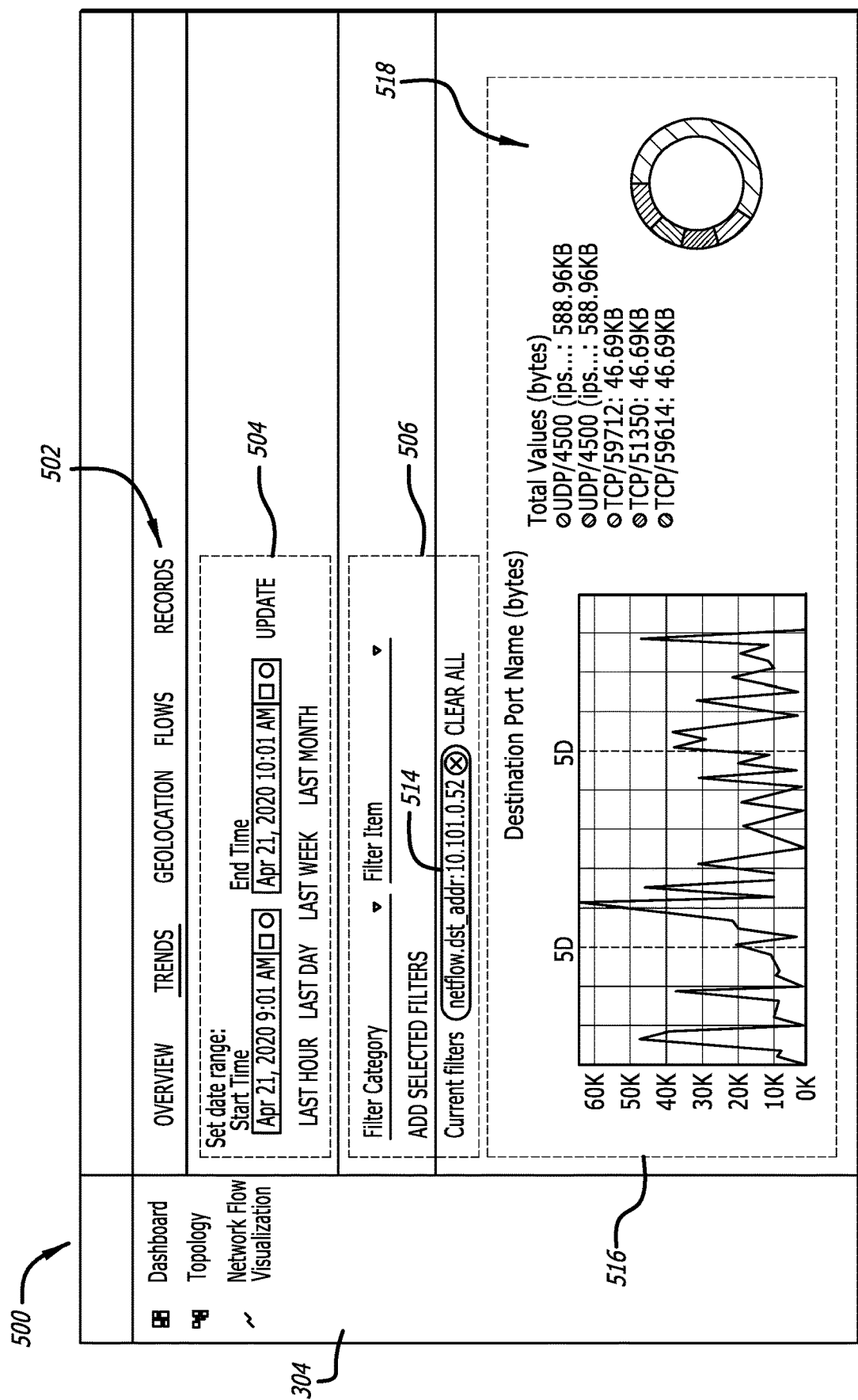

In addition, as shown in FIGS. 5B-5C, the illustrations of the charts $510_1$-$510_i$ of the display portion 508 may be filtered according to input received via the display portion 504, the category selection and search term input fields of display portion 506, and/or selection of data displayed in one or more of the charts $510_1$-$510_i$.

Referring now to FIG. 5B, an exemplary illustration of a visualization of the network flow visualization 500 generated by the topology system logic 138 is shown in accordance with some embodiments. As shown, the network flow visualization 500 is filtered according to the filter 514, which corresponds to the selection of a portion of the chart $510_2$ of FIG. 5A (e.g., the destination IP address 10.101.0.52). In response to receiving user input corresponding to the selection of the destination IP address 10.101.0.52, the topology system logic 138 filters the data displayed in each of the charts $510_1$-$510_i$ to display network traffic information pertaining to the selection. As shown, the chart $510_2'$ is displayed in an altered visual in comparison to the chart $510_2$ of FIG. 5A. It should be understood that multiple filters may be applied simultaneously.

ii. Trends

Referring to FIG. 5C, an exemplary illustration of a visualization of the network flow visualization 500 generated by the topology system logic 138 directed to illustrating "trends" of the flow of the network traffic is shown in accordance with some embodiments. FIG. 5C illustrates the "trends" aspect of the network flow visualization 500, which includes the display portions 504-506 discussed with respect to FIGS. 5A-5B. Additionally, the "trends" aspect may include display portions 516-518, which include a graph over time of network traffic in bytes according to destination port name and a chart $518_1$ illustrating the network traffic in bytes of a plurality of destination port names. Although not shown, additional graphs and charts similar to those of display portion 516 may be also be displayed for data categories (e.g., those illustrated in FIG. 5B such as source IP, destination IP, destination ports and IPs, source ports and IPs, source port, etc.).

As shown, the network flow visualization 500 is filtered according to the filter 514, which was generated and applied via the "overview" aspect of the network flow visualization 500 and discussed above. Thus, the topology system logic 138 is configured to apply filters that are persistent throughout the network flow visualization 500, which means that a filter applied in one aspect, e.g., "overview," will be maintained across other aspects, e.g., "trends" and filter the data illustrated therein.

Figure 5D:
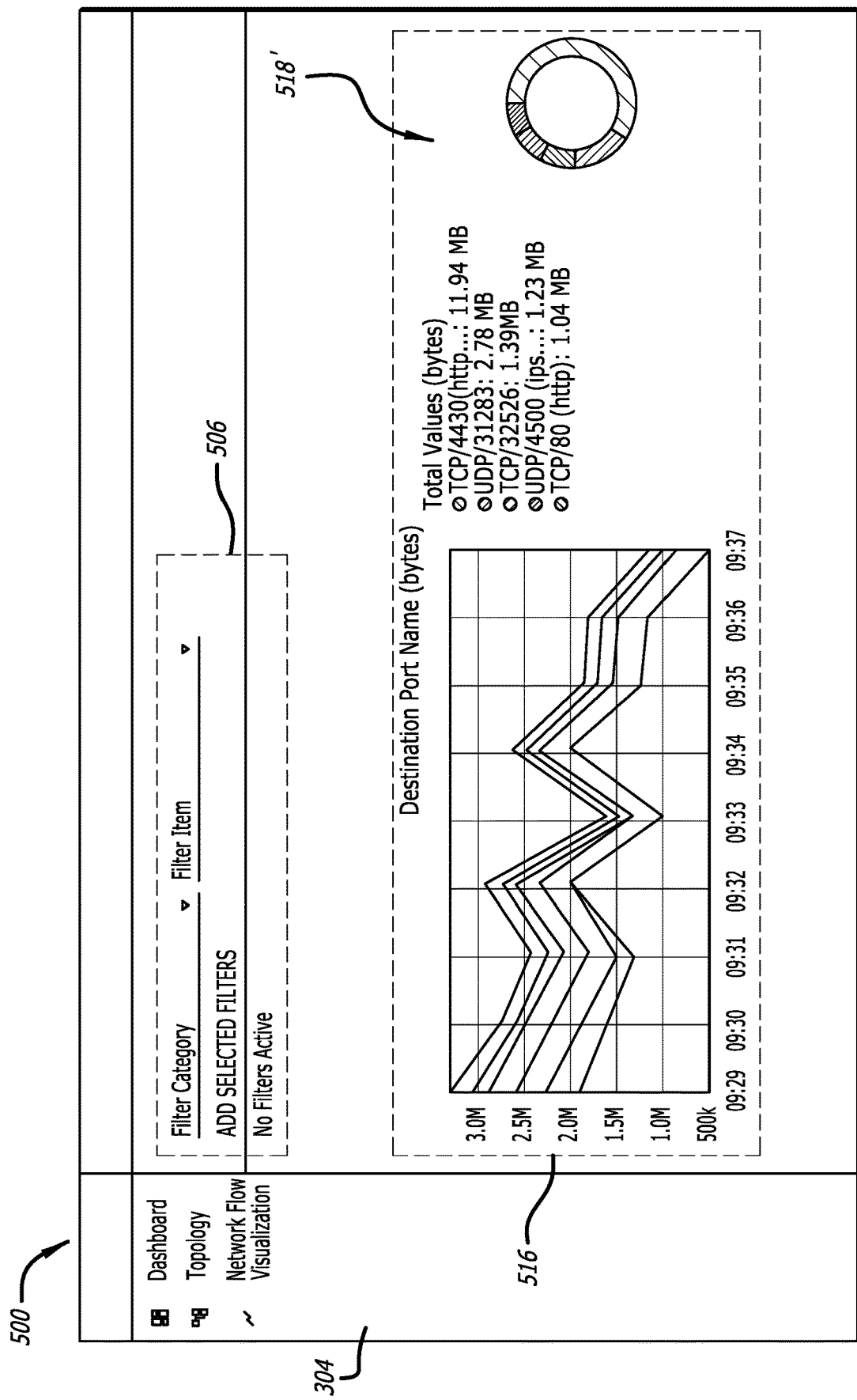

Referring now to FIG. 5D, an exemplary illustration of a visualization of the network flow visualization 500 generated by the topology system logic 138 directed to illustrating a filtered view of the graph shown in FIG. 5C is shown in accordance with some embodiments. As illustrated in FIG. 5C, a portion of the graph of the display portion 516 was selected via the indicators 5D-5D. FIG. 5D illustrates that topology system logic 138 is configured to receive user input corresponding to selection of a portion of the graph, such as 5D-5D, and alter the magnification of the graph (e.g., zoom in) to highlight the selected portion. As the chart $518_1$ of FIG. 5C corresponds to the graph of the display portion 516, the chart $518_1$ is shown in FIG. 5D as the filtered version $518_1'$ displaying network traffic data according to destination port name filtered by the selection 5D-5D.

iii. Geolocation

Figure 5E:
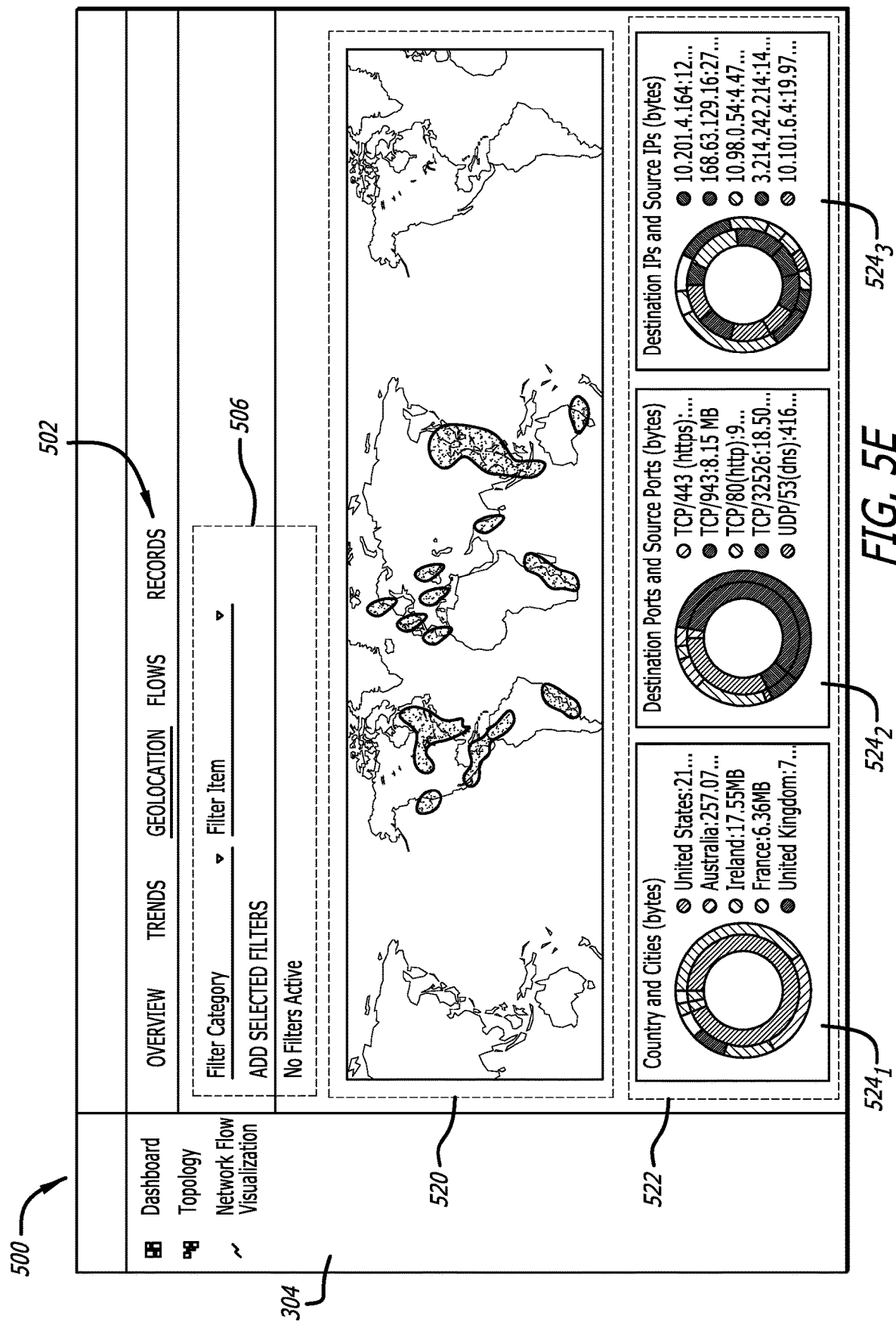

Referring to FIG. 5E, an exemplary illustration of a visualization of the network flow visualization 500 generated by the topology system logic 138 directed to illustrating "geolocation" of the flow of the network traffic is shown in accordance with some embodiments. FIG. 5E illustrates the "geolocation" aspect of the network flow visualization 500, which includes at least the display portion 506 discussed with respect to FIGS. 5A-5B (in some embodiments, the display portion 504 may be included as well). Additionally, the "geolocation" aspect may include display portions 520-522. The display portion 520 illustrates a "heat map," which includes a map of a geographic region, e.g., a world map, that includes visual indicators as to a density of network traffic at various locations on the map. As shown in the illustrative embodiment of FIG. 5E, the heat map 520 includes visual indicators representing a heat map to illustrate the varying density of network traffic flowing among the constructs managed by the controller 102, where the density of network traffic flowing among constructs may comprise heat map information. Further, the charts $524_1$-$524_3$ provide additional graphical representations of the network traffic data shown in the heat map 520 (e.g., network traffic in bytes per country and/or city, network traffic in bytes per destination port and source port, network traffic in bytes per destination IP and source IP). It should be understood that although three (3) charts are illustrated, an alternative number may be illustrated such as one (1), two (2) or more than three (3). Additionally, heat map information may include results of applying various filters to the network traffic as illustrated in at least FIG. 5E.

Specifically, the topology system logic 138 determines the density of the network traffic flowing among the constructs based on the construct metadata and the network data received from the controller 102 and the gateways managed by the controller 102, respectively. In some embodiments, the illustration of shown in FIG. 5E may be updated on a periodic or aperiodic basis (e.g., in response to a triggering event such as received user input initiating a refresh).

In a similar manner as was discussed above with respect to the user interfaces of FIGS. 3A-5D, the heat map 520 and the charts of the display portion 522 may be filtered in various manners such as through receipt of user input via the display portion 506, selection of a portion of any chart of the display portion 522, or via a persistent filter applied via a different "aspect" of the network flow visualization 500.

iv. Flows

Figure 5F:
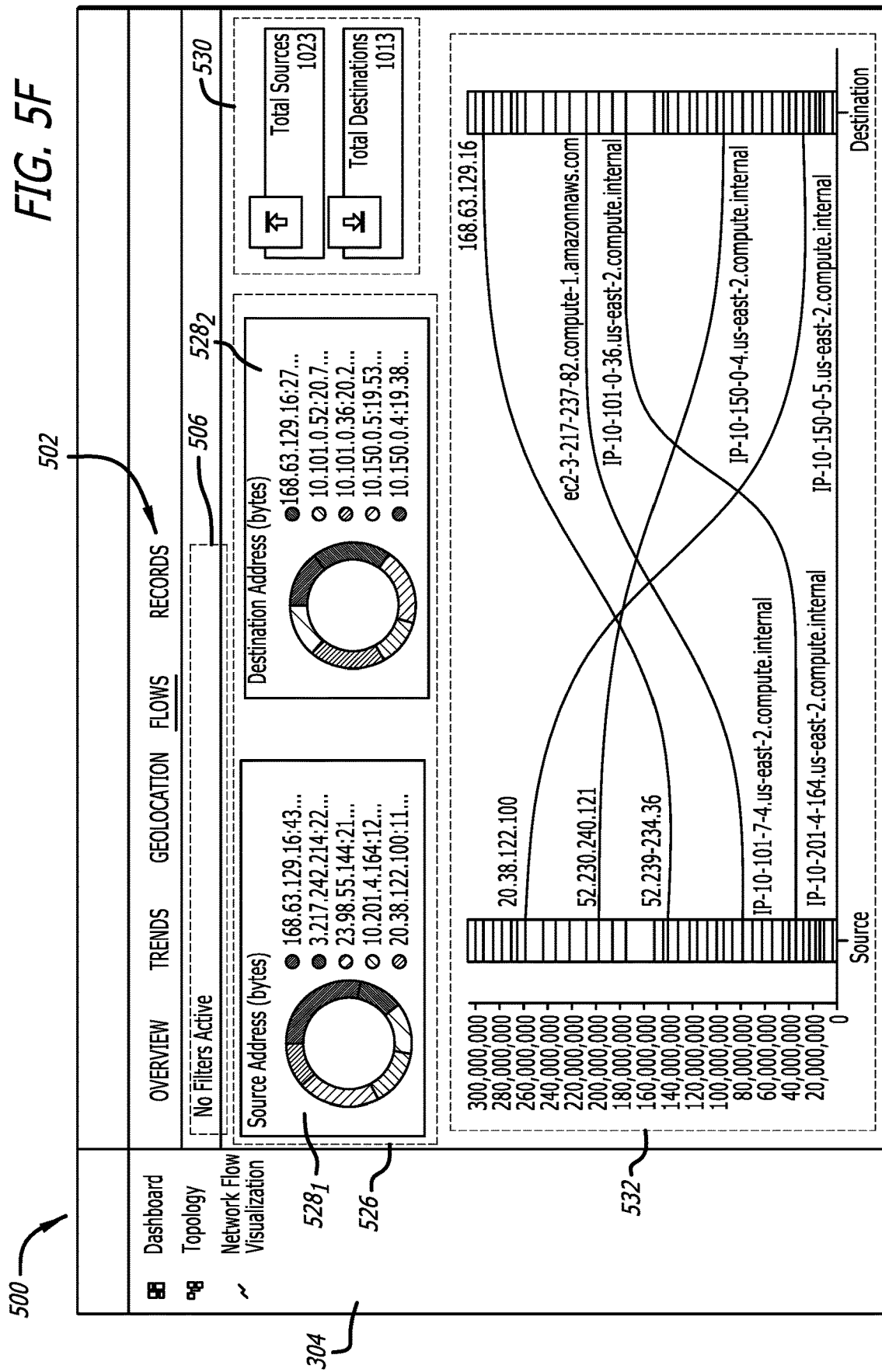

Referring to FIG. 5F, an exemplary illustration of a visualization of the network flow visualization 500 generated by the topology system logic 138 directed to illustrating "flows" aspect of the network traffic is shown in accordance with some embodiments. FIG. 5F illustrates the "geolocation" aspect of the network flow visualization 500, which includes at least the display portion 506 discussed with respect to FIGS. 5A-5B (in some embodiments, the display portion 504 may be included as well). Additionally, the "flows" aspect may include display portions 526, 530 and 532. The display portion 526 illustrates a plurality of charts $528_1$-$528_2$, which may be similar to charts of the display portion 522 but display content such as network traffic in bytes per source address and network traffic in bytes per destination address. It should be understood that although two (2) charts are illustrated, an alternative number may be illustrated such as one (1) or more than two (2).

The display portion 530 may be a visual of the number of source IPs and destination IPs managed by the controller 102. Additionally, the display portion 532 illustrates a graphical representation of network traffic flowing from source IPs to destination IPs. In some embodiments, such as that of FIG. 5F, the graphical representation may display a series of flow lines from a source IP address to a destination IP address, wherein each flow line is illustrated in a visually distinct manner (e.g., different colors for each flow line). The graphical representation may be configured to receive user input selecting a source or destination IP address, and responsive to receiving such user input, the topology system logic 138 is configured to alter the graphical representation to emphasis (or singularly display) the flow(s) associated with the selected IP address. Additionally, the content displayed in each of the display portions 524 and 520 may be filtered and adjusted in accordance with the selected IP address to provide network data corresponding to the selected IP address.

v. Records

Figure 5G:
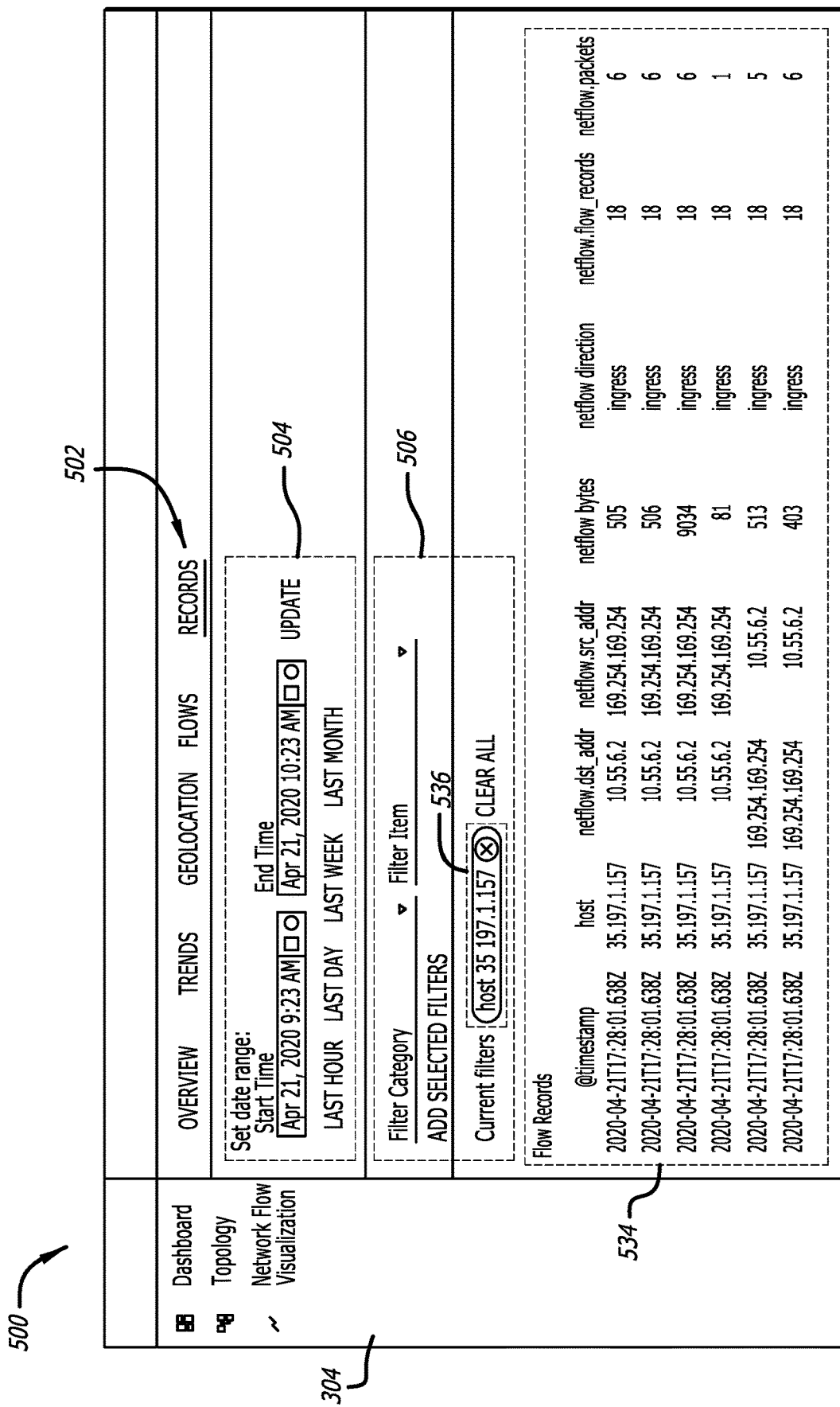

Referring to FIG. 5G, an exemplary illustration of a visualization of the network flow visualization 500 generated by the topology system logic 138 directed to illustrating "records" aspect of the network traffic is shown in accordance with some embodiments. FIG. 5F illustrates the "records" aspect of the network flow visualization 500, which includes at least the display portions 504-506 discussed with respect to FIGS. 5A-5B.

Additionally, the "records" aspect of the network flow visualization 500 includes the display portion 534, which illustrates a graphical representation, for example, a table format, of details regarding the network traffic flows illustrated in FIG. 5F. For example, the table may include columns providing data pertaining to: a timestamp, a host, a destination IP address, a source IP address, the number of bytes in the flow at the time indicated by the timestamp, the direction of the flow of network traffic (ingress or egress), the number of data packets transmitted at the time indicated by the timestamp, etc.

IV. Logical Flow

Figure 6:
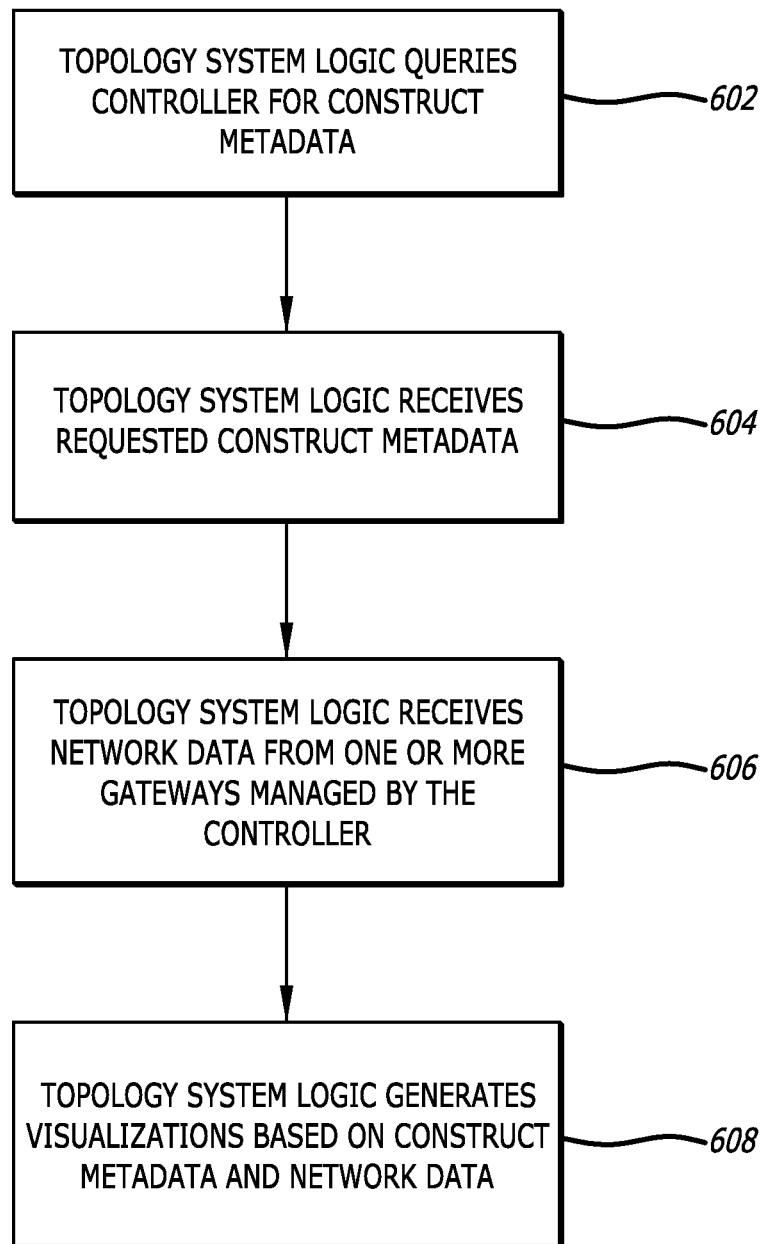
FIG. 6 is a flowchart of an exemplary method of communications between the topology system logic, a controller and one or more gateways managed by the controller according to some embodiments.

Referring now to FIG. 6, a flowchart of an exemplary method of communications between the topology system logic, a controller and one or more gateways managed by the controller is shown according to some embodiments. Each block illustrated in FIG. 6 represents an operation performed in the method 600 of exchanging communications with a controller and receiving data from one or more gateways managed by the controller. Prior to the initiation of the method 600, it may be assumed that a distributed cloud management system, such as that illustrated in FIG. 1, has been deployed. The method 600 is initiated when a topology system logic, such as the topology system logic 138 of FIG. 1, queries a controller, such as the controller 102 of FIG. 1 for construct metadata (block 602). As discussed above, the queries may be via one or more API calls. Subsequently, the topology system logic 138 receives the requested construct metadata and stores the received data in a database, such as the construct metadata database 220 of FIG. 2B (block 604).

Further, the topology system logic receives network data from one or more gateways that are managed by the controller (block 606). The topology system logic proceeds to store the received network data in a database, such as the network data database 222 of FIG. 2B.

Following receipt of the construct metadata and the network data, the topology system logic generates one or more visualizations based on the received data (block 608). Exemplary visualizations that may be generated are illustrated in FIGS. 3A-5G; however, the visualizations that may be generated by the topology system logic are not limited to those illustrated.

Figure 7A:
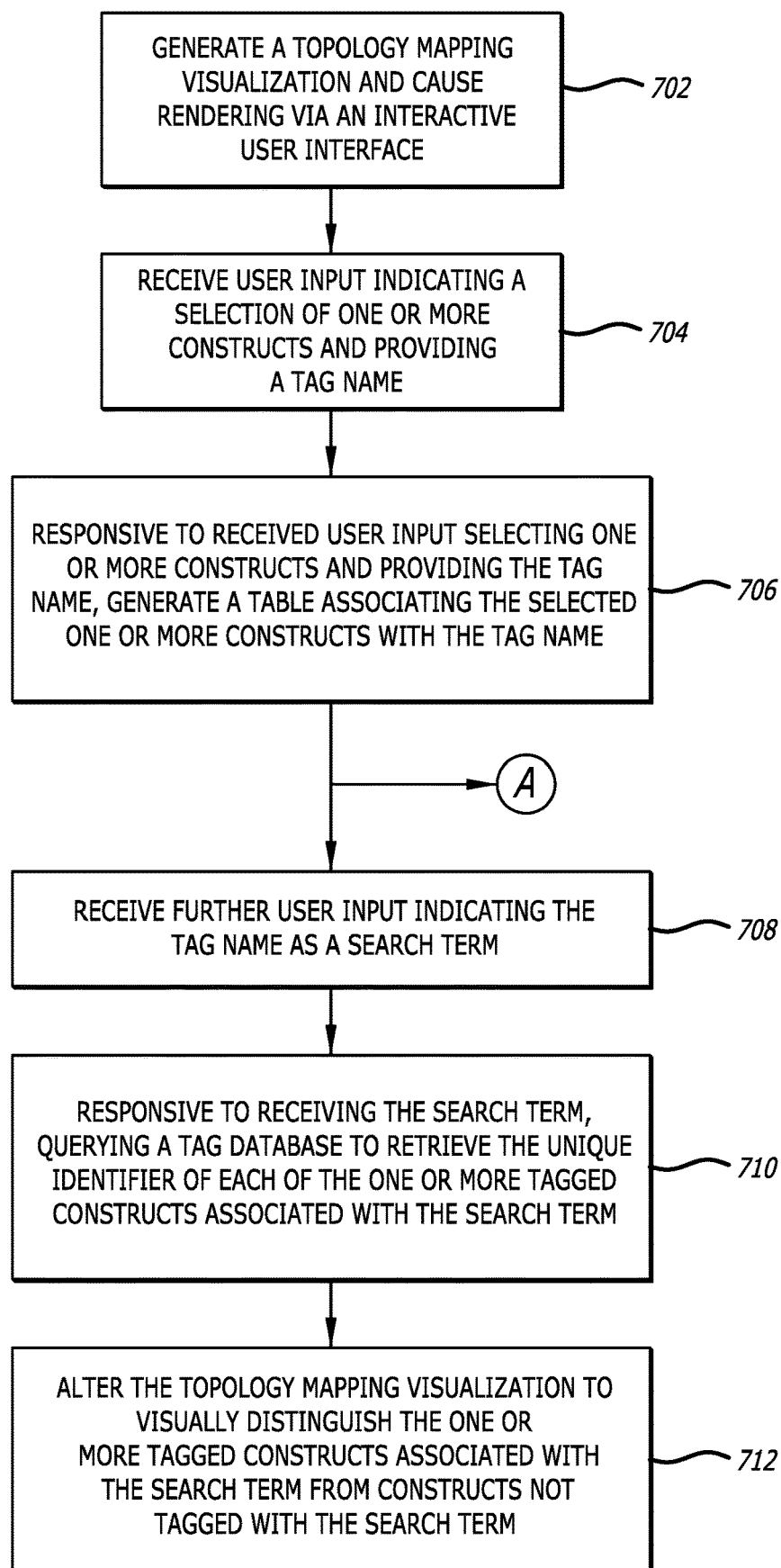

Referring to FIGS. 7A-7B, a flowchart of methods of tagging and searching performed by the topology system logic and illustrated in FIGS. 4A-5A is shown according to some embodiments. Each block illustrated in FIGS. 7A-7B represents an operation performed in the method 700 of tagging and searching operations performed by the topology system logic. Prior to the initiation of the method 700, it may be assumed that a distributed cloud management system, such as that illustrated in FIG. 1, has been deployed. The method 700 is initiated when a topology system logic, such as the topology system logic 138 of FIG. 1, generates a topology mapping visualization and causes rendering via an interface user interface (block 702). Following generation of the topology mapping visualization, the topology system logic receives user input via the topology mapping visualization corresponding to selection of one or more constructions and further indicates a tag name (block 704). Responsive to the received user input, the topology system logic generates a table associating the unique identifier of the selected one or more constructs with the tag name (block 706).

Following the generation of the table, the method 700 may proceed to either block 708 and/or block 714. Referring to block 708, the topology system logic receives further user input indicating the tag name as a search term via the topology mapping visualization. Responsive to receiving the search term, the topology system logic queries a tag database storing the previously generated table to retrieve a unique identifier of each of the one or more tagged constructs associated with the search term (block 710). Following retrieval of the unique identifiers, the topology system logic performs operations causing alteration of the topology mapping visualization that visually distinguish the one or more tagged constructs associated with the search term from constructs not associated with the search term (block 712). For example, the alteration may include providing a visualization that only displays graphical representations of the tagged constructs associated with the search term and corresponding network data including links therebetween. However, other alternations have been considered such as increasing the size of the tagged constructs (and corresponding network data) associated with the search term relative to the other constructs and network data (or decreasing the size of the non-tagged constructs).

Referring now to FIG. 7B and block 714, following the generation of the table, the topology system logic generates a visualization of the flow of the network traffic among (between, to and/or from) one or more constructs managed by the controller. It should be noted that the operations of block 714 may be performed prior to the generation of the table in some embodiments. The topology system logic receives further user input via the visualization of the flow of the network traffic that indicates the tag name as a filter term (block 716).

Responsive to receiving the filter term, the topology system logic queries a tag database to retrieve the unique identifiers of each of the one or more constructs associated with the filter term (block 718). Following retrieval of the unique identifiers, the topology system logic performs operations causing alteration of the visualization of the flow of network traffic to display illustrations of only the flow of network traffic among the one or more constructs associated with the filter term (block 720). For example, an exemplary visualization is shown in FIG. 5A.

Referring now to FIG. 8, a flowchart of an exemplary method of the replay function performed by the topology system logic and illustrated in FIGS. 4G-4H is shown according to some embodiments. Each block illustrated in FIG. 8 represents an operation performed in the method 800 of operations performed by the topology system logic comprising a replay functionality. Prior to the initiation of the method 800, it may be assumed that a distributed cloud management system, such as that illustrated in FIG. 1, has been deployed. The method 800 is initiated when a topology system logic, such as the topology system logic 138 of FIG. 1, records, at a first time instance, construct metadata and optionally at least a portion of network data for all constructs managed by a controller (block 802). Further, the topology system logic records, at a second, subsequent time instance, construct metadata and optionally at least a portion of network data for all constructs managed by the controller (block 804).

Following recording (e.g., storing in a database such as the snapshot database 218 of FIG. 2B) of the data at the first and second time instances and in response to user input indicating an initiation of a comparison between the state of the constructs managed by the controller (and links therebetween), the topology system logic performs a comparison between the recorded data at the first time instance with the recorded data at the second time instance (block 806).

In further response to the user input, the topology system logic generates a topology mapping visualization illustrating the one or more differences, if any, between the recorded data at the first and second time instances and causes a rendering via an interface user interface (block). Exemplary visualizations are shown in FIGS. 4G-4G; however, the visualizations that may be generated are not limited to those shown.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A distributed cloud computing system comprising:
   a controller configured to deploy a first gateway in a first cloud computing network and a second gateway in a second cloud computing network; and
   logic, stored on non-transitory, computer-medium, that, upon execution by one or more processors, causes performance of operations including:
      receiving, from the controller, metadata pertaining to a plurality of constructs;
      receiving, from each of the first gateway and the second gateway, network data, wherein a combination of the metadata and the network data identify communication paths between each construct;
      generating a topology mapping visualization illustrating the plurality of constructs and the communication paths therebetween, wherein a first subset of the plurality of constructs are deployed in the first cloud computing network and a second subset of the plurality of constructs are deployed in the second cloud computing network;
      receiving user input corresponding to a selection of one or more constructs of the plurality of constructs;
      generating a filtered topology mapping visualization of the selection of the one or more constructs and any connections therebetween, and
      causing rendering of the filtered topology mapping visualization on a display screen of a network device.

2. The distributed cloud computing system of claim 1, wherein the combination of the metadata and the network data identify each of the plurality of constructs and in which cloud computing network each construct is deployed.

3. The distributed cloud computing system of claim 1, wherein the logic, upon execution by the one or more processors, causes performance of further operations prior to receiving the user input corresponding to the selection of the one or more constructs including:
   causing rendering of the topology mapping visualization on the display screen of the network device.

4. The distributed cloud computing system of claim 1, wherein the logic, upon execution by the one or more processors, causes performance of further operations including:
   receiving user input corresponding to an identifier for the selection of the one or more constructs;
   storing an indication of the selection of one or more constructs, and the identifier, including generating a table within a database associating the identifier with each selected construct.

5. The distributed cloud computing system of claim 1, wherein the logic, upon execution by the one or more processors, causes performance of further operations prior to generating the filtered topology mapping visualization including:
   receiving user input corresponding to an identifier for the selection of the one or more constructs;
   receiving further user input corresponding to a search term, wherein the search term is the identifier, and wherein generating the filtered topology mapping visualization is in accordance with the search term.

6. The distributed cloud computing system of claim 1, wherein generating the filtered topology mapping visualization includes:
   excluding all constructs and communication paths except the selected constructs and all communication pathways therebetween.

7. The distributed cloud computing system of claim 1, wherein the logic, upon execution by the one or more processors, causes performance of further operations including:
   generating and causing rendering of a visualization illustrating network traffic metrics, wherein the network traffic metrics pertain to transmission and receipt of network traffic between constructs deployed in the first cloud computing network and the second cloud computing network;
   receiving user input corresponding to an identifier for the selection of the one or more constructs;
   receiving further user input corresponding to a search term, wherein the search term is the identifier; and
   generating and causing rendering of a filtered visualization illustrating the network traffic metrics filtered in accordance with the search term.

8. A computerized method comprising:
   receiving, from a controller, metadata pertaining to a plurality of constructs;
   receiving, from each of the first gateway and the second gateway, network data, wherein a combination of the metadata and the network data identify communication paths between each construct;
   generating a topology mapping visualization illustrating the plurality of constructs and the communication paths therebetween, wherein a first subset of the plurality of constructs are deployed in a first cloud computing network and a second subset of the plurality of constructs are deployed in a second cloud computing network;
   receiving user input corresponding to a selection of one or more constructs of the plurality of constructs;
   generating a filtered topology mapping visualization of the selection of the one or more constructs and any connections therebetween; and
   causing rendering of the filtered topology mapping visualization on a display screen of a network device.

9. The computerized method of claim 8, wherein the combination of the metadata and the network data identify each of the plurality of constructs and in which cloud computing network each construct is deployed.

10. The computerized method of claim 8, further comprising:
    prior to receiving the user input corresponding to the selection of the one or more constructs, causing rendering of the topology mapping visualization on the display screen of the network device.

11. The computerized method of claim 8, further comprising:
    receiving user input corresponding to an identifier for the selection of the one or more constructs;
    storing an indication of the selection of one or more constructs, and the identifier, including generating a table within a database associating the identifier with each selected construct.

12. The computerized method of claim 8, further comprising:
    receiving user input corresponding to an identifier for the selection of the one or more constructs;

prior to generating the filtered topology mapping visualization, receiving further user input corresponding to a search term, wherein the search term is the identifier, and wherein generating the filtered topology mapping visualization is in accordance with the search term.

13. The computerized method of claim 8, wherein generating the filtered topology mapping visualization includes:
excluding all constructs and communication paths except the selected constructs and all communication pathways therebetween.

14. The computerized method of claim 8, further comprising:
generating and causing rendering of a visualization illustrating network traffic metrics, wherein the network traffic metrics pertain to transmission and receipt of network traffic between constructs deployed in the first cloud computing network and the second cloud computing network;
receiving user input corresponding to an identifier for the selection of the one or more constructs;
receiving further user input corresponding to a search term, wherein the search term is the identifier; and
generating and causing rendering of a filtered visualization illustrating the network traffic metrics filtered in accordance with the search term.

15. A non-transitory computer-readable medium having stored thereon logic that, when executed by one or more processors, causes operations including:
receiving, from a controller, metadata pertaining to a plurality of constructs;
receiving, from each of the first gateway and the second gateway, network data, wherein a combination of the metadata and the network data identify communication paths between each construct;
generating a topology mapping visualization illustrating the plurality of constructs and the communication paths therebetween, wherein a first subset of the plurality of constructs are deployed in a first cloud computing network and a second subset of the plurality of constructs are deployed in a second cloud computing network;
receiving user input corresponding to a selection of one or more constructs of the plurality of constructs;
generating a filtered topology mapping visualization of the selection of the one or more constructs and any connections therebetween; and
causing rendering of the filtered topology mapping visualization on a display screen of a network device.

16. The non-transitory computer-readable medium of claim 15, wherein the combination of the metadata and the network data identify each of the plurality of constructs and in which cloud computing network each construct is deployed.

17. The non-transitory computer-readable medium of claim 15, wherein the logic, upon execution by the one or more processors, causes performance of further operations prior to receiving the user input corresponding to the selection of the one or more constructs including:
causing rendering of the topology mapping visualization on the display screen of the network device.

18. The non-transitory computer-readable medium of claim 15, wherein the logic, upon execution by the one or more processors, causes performance of further operations including:
receiving user input corresponding to an identifier for the selection of the one or more constructs;
storing an indication of the selection of one or more constructs, and the identifier, including generating a table within a database associating the identifier with each selected construct.

19. The non-transitory computer-readable medium of claim 15, wherein generating the filtered topology mapping visualization includes:
excluding all constructs and communication paths except the selected constructs and all communication pathways therebetween.

20. The non-transitory computer-readable medium of claim 15, wherein the logic, upon execution by the one or more processors, causes performance of further operations including:
generating and causing rendering of a visualization illustrating network traffic metrics, wherein the network traffic metrics pertain to transmission and receipt of network traffic between constructs deployed in the first cloud computing network and the second cloud computing network;
receiving user input corresponding to an identifier for the selection of the one or more constructs;
receiving further user input corresponding to a search term, wherein the search term is the identifier; and
generating and causing rendering of a filtered visualization illustrating the network traffic metrics filtered in accordance with the search term.

\* \* \* \* \*